(12) United States Patent
Wang et al.

(10) Patent No.: US 10,282,844 B2
(45) Date of Patent: May 7, 2019

(54) SYSTEM AND METHOD FOR IMAGE SEGMENTATION

(71) Applicant: SHANGHAI UNITED IMAGING HEALTHCARE CO., LTD., Shanghai (CN)

(72) Inventors: Lilong Wang, Shanghai (CN); Lijia Wang, Shanghai (CN); Yufei Mao, Shanghai (CN); Xiaolin Meng, Shanghai (CN); Xiaodong Wang, Shanghai (CN); Cheng Li, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 190 days.

(21) Appl. No.: 15/320,466

(22) PCT Filed: May 5, 2016

(86) PCT No.: PCT/CN2016/081175
§ 371 (c)(1),
(2) Date: Dec. 20, 2016

(87) PCT Pub. No.: WO2016/177337
PCT Pub. Date: Nov. 10, 2016

(65) Prior Publication Data
US 2017/0206662 A1    Jul. 20, 2017

(30) Foreign Application Priority Data

May 5, 2015   (CN) .......................... 2015 1 0224781

(51) Int. Cl.
*G06K 9/00*   (2006.01)
*G06T 7/11*   (2017.01)
(Continued)

(52) U.S. Cl.
CPC ................ *G06T 7/11* (2017.01); *G06T 7/136* (2017.01); *G06T 7/143* (2017.01); *G06T 7/155* (2017.01);
(Continued)

(58) Field of Classification Search
None
See application file for complete search history.

(56) References Cited

U.S. PATENT DOCUMENTS 6,466,687 B1    10/2002   Uppaluri et al.
2002/0006216 A1    1/2002   Armato, III et al.
(Continued)

FOREIGN PATENT DOCUMENTS

| CN | 1795825 A | 7/2006 |
|----|-----------|--------|
| CN | 101138498 A | 3/2008 |

(Continued)

OTHER PUBLICATIONS

P. Berger, V. Perot, et al, "Airway wall thickness in cigarette smokers: Quantitative thin-section CT assessment", Radiology, vol. 235, No. 3, pp. 1055-1064, 2005.
(Continued)

*Primary Examiner* — Atiba O Fitzpatrick
(74) *Attorney, Agent, or Firm* — Metis IP LLC

(57) ABSTRACT

A system and method for image segmentation are provided. A three-dimensional image data set representative of a region including at least one airway may be acquired. The data set may include a plurality of voxels. A first-level seed within the region may be identified. A first-level airway within the region may be identified based on the first-level seed. A second-level airway may be identified within the region based on the first-level airway. The first-level airway and the second-level airway may be fused to form an airway tree.

20 Claims, 16 Drawing Sheets

(51) Int. Cl.
G06T 7/143 (2017.01)
G06T 7/155 (2017.01)
G06T 7/187 (2017.01)
G06T 7/136 (2017.01)

(52) U.S. Cl.
CPC .......... G06T 7/187 (2017.01); G06T 2200/04 (2013.01); G06T 2207/10072 (2013.01); G06T 2207/20156 (2013.01); G06T 2207/20161 (2013.01); G06T 2207/30061 (2013.01)

(56) References Cited

U.S. PATENT DOCUMENTS

| | | | |
|---|---|---|---|
| 2002/0009215 | A1 | 1/2002 | Armato, III et al. |
| 2007/0133894 | A1* | 6/2007 | Kiraly ................. G06K 9/4609 382/260 |
| 2007/0140541 | A1 | 6/2007 | Bae et al. |
| 2007/0297659 | A1 | 12/2007 | Collins |
| 2012/0081362 | A1 | 4/2012 | Kiraly et al. |
| 2012/0268450 | A1 | 10/2012 | Kiraly et al. |
| 2014/0341426 | A1 | 11/2014 | Wu et al. |

FOREIGN PATENT DOCUMENTS

| | | |
|---|---|---|
| CN | 102243759 A | 11/2011 |
| CN | 102521833 A | 6/2012 |
| CN | 102982531 A | 3/2013 |
| CN | 104504737 A | 4/2015 |
| JP | 2008142482 A | 6/2008 |
| WO | 2008050223 A2 | 5/2008 |
| WO | 2016086744 A1 | 6/2016 |

OTHER PUBLICATIONS

X. Zhou, T. Hayashi, et al, "Automatic segmentation and recognition of anatomical lung structures from high-resolution chest CT images", Comput. Med. Imag. Graph., vol. 30, No. 5, pp. 299-313, 2006.
E. M. van Rikxoort, M. Prokop, et al, "Automatic segmentation of pulmonary lobes robust against incomplete fissures", IEEE Trans. Met. Imag., vol. 29, No. 6, pp. 1286-1296, 2010.
M. W. Graham, J. D. Gibbs, et al, "Robust 3-D airway tree segmentation for image-guided peripheral bronchoscopy", IEEE Trans. Met. Imag., vol. 29, No. 4, pp. 982-997, 2010.
K. Mori, J. Hasegawa, J. Toriwaki, H. Anno, and K. Katada, "Recognition of bronchus in three dimensional X-Ray CT images with application to virtualized bronchoscopy system", in Proc. 13th Int. Conf. Pattern Recognit., vol. III, No. 4, pp. 528-532, Aug. 1996.
A. P. Kiraly, W. E. Higgins, E. A. Hoffman, G. McLennan, and J. M. Reinhardt, "3D human airway segmentation methods for clinical virtual bronchoscopy", Acad. Radiol., vol. 9, No. 10, pp. 1153-1168, Oct. 2002.
T. Tozaki et al., "Pulmonary organs analysis for differential diagnosis based on thoracic thin-section CT images", IEEE Trans. Nucl. Sci., vol. 45, No. 6, pp. 3075-3082, Dec. 1998.
C. Pisupati, L. Wolff, W. Mitzner, and E. Zerhouni, "Segmentation of 3-D pulmonary trees using mathematical morphology", in Proc. Math. Morphol. Appl. Image Signal Process., pp. 409-416, May 1996.
D. Aykac, E. A. Hoffman, G. McLennan, and J. M. Reinhardt, "Segmentation and analysis of the human airway tree from three-dimensional X-ray CT images", IEEE Trans. Med. Imag., vol. 22, No. 8, pp. 940-950, Aug. 2003.
Catalin I. Fetita, Philippe Grenier, et al, "Pulmonary airways: 3-D reconstruction from multislice CT and clinical investigation", IEEE Trans. Med. Imag., vol. 23, No. 11, pp. 1353-1364, 2004.
E. A. Hoffman and G. McLennan, "Assessment of the pulmonary structure-function relationship and clinical outcomes measures: Quantitative volumetric CT of the lung", Academic Radiol., vol. 4, No. 11, pp. 758-776, 1997.
R. Uppaluri, T. Mitsa, M. Sonka, E. A. Hoffman, and G. McLennan, "Quantification of pulmonary emphysema from lung CT images using texture analysis", Amer. J. Resp. Crit. Care Med., vol. 156, No. 1, pp. 248-254, 1997.
E. A. Hoffman, T. Behrenbeck, P. A. Chevalier, and E. H. Wood, "Estimation of regional pleural surface expansile forces in intact dogs", J.Appl. Physiol., vol. 55, No. 3, pp. 935-948, 1983.
I. Sluimer, A. Schilham, M. Prokop, and B. van Ginneken. "Computer analysis of computed tomography scans of the lung: A survey", IEEE Transactions on Medical Imaging, 25(4):385-405, Apr. 2006.
W. A. Kalender, H. Fichte, W. Bautz, and M. Skalej, "Semiautomatic evaluation procedures for quantitative CT of the lung", J. Comput. Assist. Tomogr., vol. 15, No. 2, pp. 248-255, 1991.
J. M. Keller, F. M. Edwards, and R. Rundle, "Automatic outlining ofregions on CT scans", J. Comput. Assist. Tomogr., vol. 5, No. 2, pp. 240-245, 1981.
J. Liu, F. Yang, and J. Gong, "A remote sensing image edge detection algorithm based on fusion technology", Journal of Chongqing University of Posts and Telecommunications (Natural Science Edition), 21(3):445-448, 2009.
Armato SG III, Sensakovic WF, "Automated lung segmentation for thoracic CT impact on computer-aided diagnosis", Acad Radiol, 11(9):1011-21, Sep. 2004.
S. Hu, E. Hoffman, and J. Reinhardt, "Automatic lung segmentation for accurate quantitation of volumetric X-ray CT images", IEEE Transactions on Medical Imaging, 20(6):490-498, Jun. 2001.
X. Sun, H. Zhang, and H. Duan, "3D computerized segmentation of lung volume with computed tomography", Academic Radiology, 13(6):670-677, 2006.
O. Weinheimer, T. Achenbach, C. Buschsiewke, C. P. Heussel, T. Uthmann, and H.-U. Kauczor, "Quantification and characterization of pulmonary emphysema in multislice-CT", In ISMDA, pp. 75-82, 2003.
X. Zhou, T. Hayashi, T. Hara, H. Fujita, R. Yokoyama, T. Kiryu, and H. Hoshi, "Automatic segmentation and recognition of anatomical lung structures from high-resolution chest CT images", Computerized Medical Imaging and Graphics, 30(5):299-313, 2006.
B. Li and J. Reinhardt, "Automatic generation of object shape models and their application to tomographic image segmentation", In M. Sonka and K. Hanson, editors, Medical Imaging 2001: Image Processing, vol. 4322, pp. 311-322. SPIE, 2001.
First Office Action for Chinese application No. 201510224781.7 dated Nov. 28, 19 pages.
Schlatholter T et al: "Simultaneous Segmentation and Tree Reconstruction of the Airways for Virtual Bronchoscopy", Visual Communications and Image Processing;Jan. 20, 2004-Jan. 20, 2004; San Jose' vol. 4684, Feb. 24, 2002, pp. 103-113, XP2385959.
Fuxing Yang:"Voluumetric Segmentation Using Shape Models in the Level Set Framework", Jan. 1, 2007, p. 161-207, XP9504992.
Qi Yingyi:"Segmentation and Reconstruction of 3D Artery Models for Surgical Planning", Jan. 1, 2008, XP55470058.
M.Orkisz et al:"Segmentation of the pulmonary vascular trees in 3D CT images using variational region-growing", IRBM, vol. 35, No. 1, Feb. 1, 2014, pp. 11-19, XP55470067.
Anonymous :"Fast marching method—Wikipedia", Apr. 19, 2018, XP55470074.
Mori K et al:"Recognition of bronchus in three-dimensional X-ray CT images with applications to vitualized bronchoscopy system", Proceedings of the 13th International Conference on Pattern Recognition Aug. 25, 1996, pp. 528-532 vol. 3, Vienna, Austria, Losalamitos, Calif.[U.A] : IEEE Computer Society Press US, XP2504066.
Second Office Action for Chinese application No. 201510224781.7 dated May 12, 2017, 13 pages.
International Search Report for PCT/CN2016/081175 dated Aug. 15, 2016, 4 pages.
Cao Lei et al., Fully automatic 3D algorithm of pulmonary parenchyma segmentation, Computer Engineering and Applications, 47(22): 137-140 (2011).
Ren Yan-Hua., The Three-dimensional Lung Segmentation from CT Images, Chinese Journal of Medical Physics, 27(3): 1862-1864 (2010).

(56) References Cited

OTHER PUBLICATIONS

Giorgio De Nunzio et al., Automatic Lung Segmentation in CT Images with Accurate Handling of the Hilar Region, Journal of Digital Imaging, 24(1): 11-27 (2011).

\* cited by examiner

SYSTEM AND METHOD FOR IMAGE SEGMENTATION

CROSS-REFERENCE TO RELATED APPLICATIONS

This application is a U.S. national stage under 35 U.S.C. § 371 of International Application No. PCT/CN2016/081175, filed on May 5, 2016, designating the United States of America, which claims priority of Chinese Patent Application No. 201510224781.7 filed on May 5, 2015, the contents of which are hereby incorporated by reference.

TECHNICAL FIELD

The present disclosure generally relates to a system and method for image processing, and more particularly, a system and method for image segmentation.

BACKGROUND

Imaging has a significant impact in medical filed. Various imaging techniques include, for example, Digital Subtraction Angiography (DSA), Magnetic Resonance Imaging (MRI), Magnetic Resonance Angiography (MRA), Computed tomography (CT), Computed Tomography Angiography (CTA), Ultrasound Scanning (US), Positron Emission Tomography (PET), Single-Photon Emission Computerized Tomography (SPECT), CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof. An image segmentation (or "recognition," "classification," "extraction," "identification," etc.) may be performed to provide an image for a target region by dividing or partitioning an image of a larger region including the target region. Segmentation is a procedure of image processing and/or a means to extract quantitative information relating to a target region from an image. Different target regions may be segmented in different ways to improve the accuracy of the segmentation. The accuracy of an image segmentation may affect the accuracy of a disease diagnosis. Thus, it is desirable to improve the accuracy of image segmentation.

SUMMARY

One aspect of the present disclosure relates to a method for image segmentation based on a three-dimensional image data set. The method may include one or more of the following operations. The three-dimensional image data set representative of a region including at least one airway may be acquired. The three-dimensional image data set may include a plurality of voxels. A first-level seed within the region including at least one airway may be identified. A first-level airway within the region may be identified based on the first-level seed. A second-level airway within the region may be identified based on the first-level airway. The identified first-level airway and the identified second-level airway may be fused to form an airway tree.

Another aspect of the present disclosure relates to a non-transitory computer readable medium including executable instructions. The instructions, when executed by at least one processor, may cause the at least one processor to effectuate a method for image segmentation.

A further aspect of the present disclosure relates to a system for image segmentation. The system may include at least one processor and instructions. The instructions, when executed by the at least one processor, may perform a method for image segmentation. The system may further include a non-transitory computer readable medium including the instructions.

In some embodiments, the system for image segmentation may include the non-transitory computer readable medium.

In some embodiments, to identify a first-level airway may include one or more of the following operations. An adjacent voxel of the first-level seed and neighboring voxels of the adjacent voxel may be selected from the plurality of voxels in the three-dimensional image data set. A characteristic value for the adjacent voxel and a characteristic value for each of the neighboring voxels may be determined. A difference between the characteristic value for the adjacent voxel and the characteristic value for each of the neighboring voxels may be calculated. The adjacent voxel may be marked as part of the first-level airway, if the characteristic value of the adjacent voxel is below a first threshold and if, for each of the neighboring voxels, the difference is below a second threshold. In some embodiments, the number of the neighboring voxels may be, for example, 26, 14, or 6.

In some embodiments, a first-level airway may be identified using a morphology based method.

In some embodiments, the identification of a first-level airway may include one or more of the following operations. A voxel set may be determined based on a level set method. A voxel may be selected from the voxel set. A first characteristic value of the voxel may be determined. The voxel may be marked as part of the first-level airway, if the first characteristic value of the voxel is below a third threshold. In some embodiments, the first characteristic value of the voxel may include a grey level. In some embodiments, the determination of the third threshold may include using an OTSU's method.

In some embodiments, the identification of a second-level airway may include one or more of the following operations. A second-level seed may be defined based on a first-level airway. A voxel set may be identified based on a level set method and the second-level seed. A voxel may be selected from the voxel set. A second characteristic value of the voxel may be determined. In some embodiments, the second characteristic value of the voxel may include an energy function value. The voxel may be marked as part of the second-level airway, if the second characteristic value of the voxel is below a fourth threshold. In some embodiments, the determination of the fourth threshold may be based on a connected domain in a lung organ region.

In some embodiments, the identification of a second-level airway may include one or more of the following operations. A plurality of second-level seeds may be defined based on a first-level airway. Growing may be performed based on the plurality of second-level seeds using an energy-based 3D reconstruction method. In some embodiments, growing may be performed based on one or more of the following operations. A plurality of adjacent voxels for each of the plurality of second-level seeds may be selected. A voxel set may be initialized. For each adjacent voxel, a first growing potential energy of the adjacent voxel at a first state may be calculated. For each adjacent voxel, a second growing potential energy of the adjacent voxel at a second state may be calculated. For each adjacent voxel, whether to add the adjacent voxel into the voxel set may be determined, based on the first growing potential energy and the second growing potential energy. Whether the voxel set belongs to the second-level airway may be determined. The voxel set may be added into a second-level airway, if the voxel set is determined to belong to the second-level airway. A new seed among the voxel set may be defined, if the voxel set is determined to belong to the second-level airway.

In some embodiments, to determine whether the voxel set belongs to the second-level airway may include one or more of the following operations. A connected domain within the voxel set may be identified. A radius of the connected domain may be determined. A voxel count of the connected domain may be determined. A first comparison between the radius of the connected domain and a fifth threshold may be performed. A second comparison may between the voxel count of the connected domain and a sixth threshold may be performed. Whether the connected domain belongs to the second-level airway may be determined, based on the first comparison and the second comparison.

In some embodiments, the determination as to whether the voxel set belongs to the second-level airway may include one or more of the following operations. A connected domain from the voxel set may be removed, if the connected domain is determined not to belong to the second-level airway.

In some embodiments, the determination as to whether the voxel set belongs to the second-level airway may include one or more of the following operations. A voxel not belonging to the second-level airway may be determined, based on the first comparison and the second comparison. The voxel may be removed from the voxel set, if the voxel is determined not to belong to the second-level airway.

In some embodiments, the first growing potential energy may be associated with at least a first weighting factor. In some embodiments, the second growing potential energy may be associated with at least a second weighting factor. In some embodiments, the first growing potential energy and the second growing potential energy may be the same. In some embodiments, the first weighting factor, or the second weighting factor, or both may be adjusted, if the voxel set is determined not to belong to the second-level airway.

In some embodiments, the three-dimensional image data may include CT image data or PET data.

In some embodiments, the first-level airway may include a low-level bronchus of a lung region. In some embodiments, the second-level airway may include a terminal bronchiole of a lung region.

In some embodiments, the method and system for airway segmentation based on a three-dimensional image data set may include one or more of the following operations. A lung organ may be identified. A lung tissue may be identified based on the fused airway and the lung organ. A left lung tissue and a right lung tissue of the identified lung tissue may be labelled based on the fused airway.

In some embodiments, the identification of a lung organ may include one or more of the following operations. An image of a 2D layer of the lung organ may be obtained. The image may be smoothed based on a morphology based method. A left lung portion of the lung organ including the second-level airway and a right lung portion of the lung organ including the second-level airway may be labelled based on the smoothed image and the first-level airway.

In some embodiments, the identification of a lung organ may include one or more of the following operations. A lung region may be determined based on the plurality of voxels. A background may be removed based on the determined lung region. A 2D layer may be determined based on area of the 2D layer. 3D region growing may be performed based on the 2D layer.

In some embodiments, a lung region may be determined based on one or more of the following operations. A voxel may be selected from the plurality of voxels. Whether the voxel belongs to the lung region may be determined based on a comparison between the characteristic value of the voxel and a seventh threshold. In some embodiments, the seventh threshold may be determined based on an OTSU's method.

In some embodiments, the removal of a background based on the determined lung region may include one or more of the following operations. A background seed may be identified near an edge of the lung region. Region growing may be performed based on the background seed.

In some embodiments, the identification of a lung organ may include one or more of the following operations. A starting 2D layer for the lung organ within the three-dimensional image data set may be determined. An ending 2D layer for the lung organ within the three-dimensional image data set may be determined.

In some embodiments, the determination of a starting 2D layer for the lung organ may include one or more of the following operations. A plurality of 2D layers may be determined within the three-dimensional image data set. A 2D layer may be detected from upstream to downstream. Whether the 2D layer contains a voxel belonging to the lung organ may be determined. The 2D layer may be identified as the starting 2D layer for the lung organ, if the 2D layer is determined to contain a voxel belonging to a lung organ.

In some embodiments, the determination of an ending 2D layer for the lung organ may include one or more of the following operations. A plurality of 2D layers may be determined within the three-dimensional image data set. A 2D layer may be detected from downstream to upstream. Whether the 2D layer contains a voxel belonging to the lung organ may be determined. The 2D layer may be identified as the ending 2D layer for the lung organ, if the 2D layer is determined to contain a voxel belonging to a lung organ.

In some embodiments, the identification of a first-level seed may include one or more of the following operations. A starting 2D layer for the first-level airway may be determined within the three-dimensional image data set. The first-level seed may be identified within the starting 2D layer for the first-level airway.

In some embodiments, the determination of a starting 2D layer for the first-level airway may include one or more of the following operations. A plurality of 2D layers may be determined within the three-dimensional image data set. A 2D layer may be detected from upstream to downstream. An area of an airway may be calculated within the 2D layer. The 2D layer may be identified as the starting 2D layer for the first-level airway, if the area is larger than 2 square millimeters.

In some embodiments, the identification of the first-level seed within the starting 2D layer for the first-level airway may include one or more of the following operations. An airway may be identified in the starting 2D layer for the first-level airway. The center of the airway may be identified as the first-level seed.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
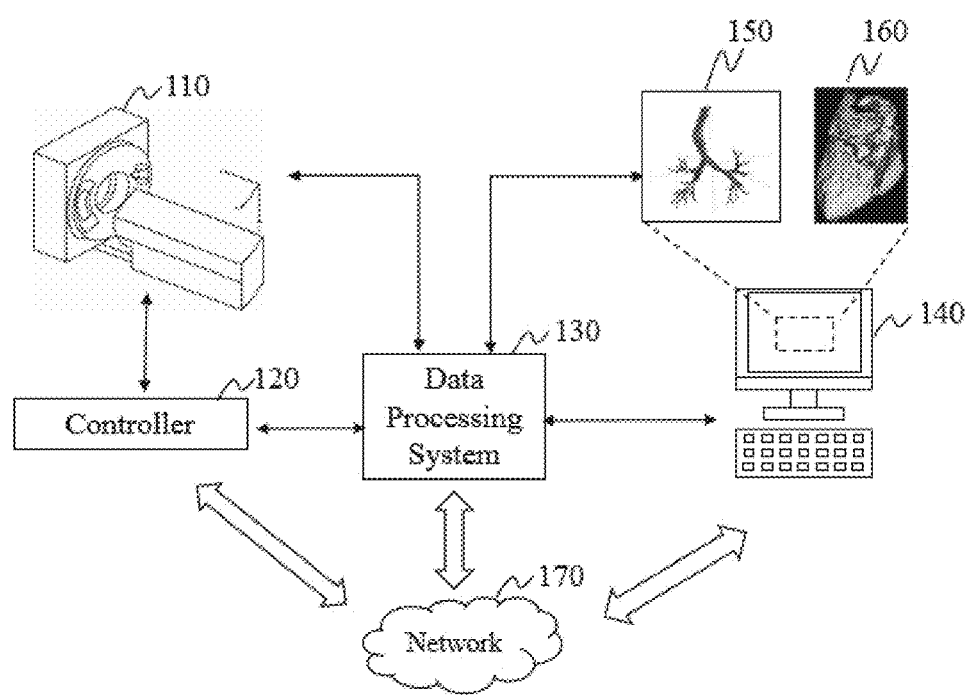
FIG. 1 illustrates an exemplary imaging system according to some embodiments of the present disclosure.

In the following detailed description, numerous specific details are set forth by way of example in order to provide a thorough understanding of the relevant application. However, it should be apparent to those skilled in the art that the present application may be practiced without such details. In other instances, well known methods, procedures, systems, components, and/or circuitry have been described at a relatively high-level, without detail, in order to avoid unnecessarily obscuring aspects of the present application. Various modifications to the disclosed embodiments will be readily apparent to those skilled in the art, and the general principles defined herein may be applied to other embodiments and applications without departing from the spirit and scope of the present application. Thus, the present application is not limited to the embodiments shown, but to be accorded the widest scope consistent with the claims.

It will be understood that when a unit, module or block is referred to as being "on," "connected to," "communicate with," "coupled to" another unit, module, or block, it may be directly on, connected or coupled to, or communicate with the other unit, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In an image processing, an image segmentation (or "recognition," "classification," "extraction," "determination," "identification," etc.) may be performed to provide an image for a target region by dividing or partitioning an image of a larger region including the target region. In some embodiments, the imaging system may include one or more modalities including Digital Subtraction Angiography (DSA), Magnetic Resonance Imaging (MRI), Magnetic Resonance Angiography (MRA), Computed tomography (CT), Computed Tomography Angiography (CTA), Ultrasound Scanning (US), Positron Emission Tomography (PET), Single-Photon Emission Computerized Tomography (SPECT), CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof. In some embodiments, the target region may be an organ, a texture, an object, a lesion, a tumor, or the like, or any combination thereof. Merely by way for example, the target region may include a head, a breast, a lung, a trachea, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. In some embodiments, the image may include a 2D image and/or a 3D image. In the 2D image, its tiniest distinguishable element may be termed as a pixel. In the 3D image, its tiniest distinguishable element may be termed as a voxel ("a volumetric pixel" or "a volume pixel"). In some embodiments, the 3D image may also be seen as a series of 2D slices or 2D layers.

The segmentation process may be performed by recognizing one or more characteristic values or features of one or more pixels and/or voxels in an image. In some embodiments, the characteristic values or features may include a gray level, a mean gray level, an intensity, texture, color, contrast, brightness, or the like, or any combination thereof. In some embodiments, one or more spatial properties of the pixel(s) and/or voxel(s) may also be considered in a segmentation process.

For illustration purposes, the following description is provided to help better understanding a segmentation process. It is understood that this is not intended to limit the scope the present disclosure. For persons having ordinary skills in the art, a certain amount of variations, changes and/or modifications may be deducted under guidance of the present disclosure. Those variations, changes and/or modifications do not depart from the scope of the present disclosure.

FIG. 1 illustrates an exemplary imaging system according to some embodiments of the present disclosure. An imaging system may produce an image of an object. As illustrated, the imaging system may include an imaging device 110, a controller 120, a data processing system 130, and an input/output device 140.

The imaging device 110 may scan an object, generate a plurality of data relating to the object. The imaging device 110 may further reconstruct an image from the plurality of data. In some embodiments, the imaging device 110 may be a medical imaging device, for example, a PET device, a SPECT device, a CT device, an MRI device, or the like, or any combination thereof (e.g., a PET-CT device, a PET-MRI device, or a CT-MRI device). In some embodiments, the imaging device 110 may include a scanner to scan an object and obtain information related with the object. In some embodiments, the imaging device 110 may be a radioactive scanning device. The radioactive scanning device may include a radioactive scanning source to emit radioactive rays to the object being scanned. The radioactive rays may include, for example, particle rays, photon rays, or the like, or any combination thereof. The particle rays may include neutron, proton, electron, µ-meson, heavy ion, or the like, or any combination thereof. The photon rays may include X-ray, γ-ray, α-ray, β-ray, ultraviolet, laser, or the like, or any combination thereof. In some embodiments, the photon ray may be X-ray, and the imaging device 110 may be a CT system, a digital radiography (DR) system, a multi-modality system, or the like, or any combination thereof. Exemplary multi-modality system may include a computed tomography-positron emission tomography (CT-PET) system, a computed tomography-magnetic resonance imaging (CT-MRI) system, or the like. In some embodiments, the imaging device 110 may include an X-ray generating unit (not shown) and an X-ray detecting unit (not shown). In some embodiments, the imaging device 110 may include a photon detector to capture the photon generated from the object being scanned. In some embodiments, the photon detector may include a scintillator, and/or a photodetector, and the imaging device 110 may be a PET system, or a multi-modality system.

The controller 120 may control the imaging device 110, the input/output device 140, and/or the data processing system 130. In some embodiments, the controller 120 may control the X-ray generating unit and/or the X-ray detecting unit (if any) of the imaging device 110. The controller 120 may receive information from or send information to the imaging device 110, the input/output device 140, and/or the data processing system 130. For example, the controller 120 may receive commands from the input/output device 140 provided by a user. As another example, the controller 130 may process data input by a user via the input/output unit 140 and transform the data into one or more commands. As still another example, the controller 120 may control the imaging device 110, the input/output device 140, and/or the data processing system 130 according to the received commands or transformed commands. As still another example, the controller 120 may receive image signals or data related to an object from the imaging device 110. As till another example, the controller 120 may send image signals or data to the data processing system 130. As till another example, the controller 120 may receive processed data or constructed image from the data processing system 130. As till another example, the controller 120 may send processed data or constructed image to the input/output device 140 for displaying. In some embodiments, the controller 120 may include a computer, a program, an algorithm, a software, a storage device, one or more interfaces, etc. Exemplary interfaces may include the interfaces of the imaging device 110, the input/output device 140, the data processing system 150, and/or other modules or units in the imaging system.

In some embodiments, the controller 120 may receive a command provided by a user including, for example, an imaging technician, a doctor, etc. Exemplary commands may relate to a scan time, a location of the object, the location of a couch on which the object lies, objection or a rotating speed of the gantry, a specific parameter relating to a threshold that may be used in the image reconstruction process, or the like, or any combination thereof. In some embodiments, the controller 120 may control the data processing system 130 to select different algorithms to process the raw data of an image.

The data processing system 130 may process information received from the imaging device 110, the controller 120, the network 170 and/or the input/output device 140. In some embodiments, the data processing system 130 may generate one or more CT images based on the information. The data processing system 130 may deliver the images to the input/output device 140 for display. In some embodiments, the data processing system 130 may perform operations including, for example, data preprocessing, image reconstruction, image correction, image composition, lookup table creation, or the like, or any combination thereof. In some embodiments, the data processing system 130 may process data based on an algorithm including, for example, Fourier slice theorem, filtered back projection algorithm, fan-beam reconstruction, iterative reconstruction, or the like, or any combination thereof. In some embodiments, image data regarding a lung organ may be processed in the data processing system 130. In some embodiments, the data processing system 130 may extract tissues or organs of interest, e.g., a bronchial tree 150, a lung tissue 160, or the like, or any combination thereof. In some embodiments, a "leakage" may occur in the extraction of a specific tissue or organ, and the data processing system 130 may apply various algorithms or methods to reduce or prevent the leakage. As used herein, the "leakage" may refer to a plurality of segmentation artifacts including, for example, a parenchymal leakage that a portion of lung parenchyma tissue may be erroneously extracted as a bronchus.

In some embodiments, the data processing system 130 may generate a control signal relating to the configuration of the imaging device 110. In some embodiments, the result generated by the data processing system 130 may be provided to other modules or units in the system including, e.g., a database (not shown), a terminal (not shown) via the network 170. In some embodiments, the data from the data processing system 130 may be transmitted to a storage (not shown) for storing.

The input/output device 140 may receive or output information. In some embodiments, the input/output device 140 may include a keyboard, a touch screen, a mouse, a remote controller, or the like, or any combination thereof. The input and/or output information may include programs, software, algorithms, data, text, number, images, voices, or the like, or any combination thereof. For example, a user may input some initial parameters or conditions to initiate an imaging process. As another example, some information may be imported from an external resource including, for example, a floppy disk, a hard disk, a wired terminal, a wireless terminal, or the like, or any combination thereof. The output information may be transmitted to a display, a printer, a storage device, a computing device, or the like, or a combination thereof. In some embodiments, the input/output device 140 may include a graphical user interface. The graphical user interface may facilitate a user to input parameters, and intervene in the data processing procedure.

In some embodiments, the imaging device 110, the controller 120, the data processing system 130, the input/output device 140 may be connected to or communicate with each other directly. In some embodiments, the imaging device 110, the controller 120, the data processing system 130, the input/output device 140 may be connected to or communicate with each other via a network 170. In some embodiments, the imaging device 110, the controller 120, the data processing system 130, the input/output device 140 may be connected to or communicate with each other via an intermediate unit (not shown in FIG. 1). The intermediate unit may be a visible component or an invisible field (radio, optical, sonic, electromagnetic induction, etc.). The connection between different units may be wired or wireless. The wired connection may include using a metal cable, an optical cable, a hybrid cable, an interface, or the like, or any combination thereof. The wireless connection may include using a Local Area Network (LAN), a Wide Area Network (WAN), a Bluetooth, a ZigBee, a Near Field Communication (NFC), or the like, or any combination thereof. The network 170 that may be used in connection with the present system described herein are not exhaustive and are not limiting.

The CT system described herein is merely provided for illustrating an example of the imaging device 110, and not intended to limit the scope of the present application. The CT system may find its applications in different fields such as, for example, medicine or industry. As another example, the imaging device 110 may be used in internal inspection of components including e.g., flaw detection, security scanning, failure analysis, metrology, assembly analysis, void analysis, wall thickness analysis, or the like, or any combination thereof.

It should be noted that the above description about the imaging system is merely an example, and should not be understood as the only embodiment. To those skilled in the art, after understanding the basic principles of the connection between different units, the units and connection between the units may be modified or varied without departing from the principles. The modifications and variations are still within the scope of the current application described above. In some embodiments, these units may be independent, and in some embodiments, part of the units may be integrated into one unit to work together.

Figure 2:
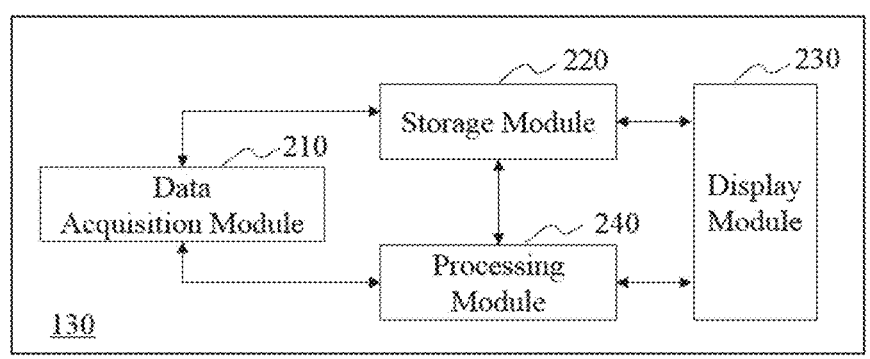
FIG. 2 is a block diagram of the data processing system according to some embodiments of the present disclosure.

FIG. 2 is a block diagram of the data processing system 130 according to some embodiments of the present disclosure. As shown in FIG. 2, the data processing system 130 may include a data acquisition module 210, a storage module 220, a display module 230, and a processing module 240. The data acquisition module 210 may be configured to acquire data. The data acquired may be generated from the imaging device 110, or the controller 120. In some embodiments, the data may be acquired from an external data source via the network 170. The data acquired may be 3D image data, and/or 2D image data. The data acquired may include information regarding a whole human body, a lung, a bronchus, a thorax, or the like, or any combination thereof. In some embodiments, the data acquisition module 210 may include a wireless receiver to receive data via the network 170.

The storage module 220 may be configured to store data. The data stored may be a numerical value, a signal, an image, information of an object, an instruction, an algorithm, or the like, or a combination thereof. The data stored may be acquired by the data acquisition module 210, imported via the input/output device 140, generated in the processing module 240, or pre-stored in the storage module 220 during system initialization or before an operation of data processing. The storage module 220 may include a system storage (e.g., a disk) that is provided integrally (i.e. substantially non-removable), or a storage that is removably connectable to the system via, for example, a port (e.g., a UBS port, a firewire port, etc.), a drive (a disk drive, etc.), etc. The storage module 220 may include, for example, a hard disk, a floppy disk, selectron storage, random access memory (RAM), dynamic random access memory (DRAM), static random access memory (SRAM), bubble memory, thin film memory, magnetic plated wire memory, phase change memory, flash memory, a cloud disk, or the like, or a combination thereof. The storage module 220 may be connected to or communicate with one or more of the data acquisition module 210, the processing module 240, and the display module 230. In some embodiments, the storage module 220 may be operationally connected with one or more virtual storage resources (e.g., cloud storage, a virtual private network, other virtual storage resources, etc.) via the network 170.

The display module 230 may be configured to display information. The information displayed may include a value, a text, an image, and information of an object. The information displayed may be transmitted from the data acquisition module 210, the storage module 220, and/or the processing module 240. In some embodiments, the display module 230 may transform information to the input/output device 140 for display. In some embodiments, the display module 230 may transform the image data that is generated from the processing module 240. In some embodiments, the display module 230 may transform the image data directly extracted from the storage module 220 or the network 170.

The processing module 240 may be configured to process data and construct an image. The data may be acquired from the data acquisition module 210, the storage module 220. The image constructed may be transmitted by the processing module 240 to the display module 230. In some embodiments, the data processed may be acquired from an external data source via the network 170. In some embodiments, the processing module 240 may reconstruct image data to generate one or more images. The image data may be reconstructed by using a reconstruction algorithm. The reconstruction algorithm may be an analytic reconstruction algorithm, an iterative reconstruction algorithm, or based on compressed sensing (CS). In some embodiments, the processing module 240 may segment the image data to obtain an image of a specific portion of an object, for example, a heart, a blood vessel, a lung, a bronchus, or the like, or any combination thereof. In some embodiments, the processing module 240 may include a universal processor, e.g., a programmed programmable logic device (PLD), a special integrated circuit (ASIC), a microprocessor, a system on chip (SoC), a digital signal processor (DSP), or the like, or any combination thereof. Two or more of these universal processors in the processing module 240 may be integrated into a hardware device, or two or more hardware devices independently with each other. It should be understood, the universal processor in the processing module 240 may be implemented via various methods. For example, in some embodiments, the processing procedure of the processing module 240 may be implemented by hardware, software, or a combination of hardware software, not only by a hardware circuit in a programmable hardware device in a ultra large scale integrated circuit, a gate array chip, a semiconductor such a transistor, or a field programmable gate array, a programmable logic device, and also by a software performed by various processors, and also by a combination of the hardware and the software above (e.g., firmware).

It should be noted that the above description about the data processing system 130 is merely an example, and should not be understood as the only embodiment. To those skilled in the art, after understanding the basic principles of the connection between different units, the units and connection between the units may be modified or varied without departing from the principles. The modifications and variations are still within the scope of the current application described above. For example, the display module 230 may be unnecessary before image displaying in the input/output device 140.

Figure 3:
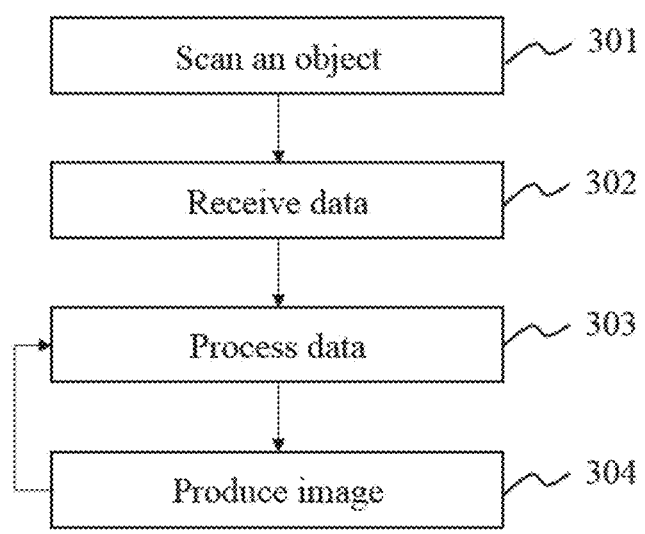
FIG. 3 is an exemplary flowchart illustrating an imaging process according to some embodiments of the present disclosure.

FIG. 3 is an exemplary flowchart illustrating an imaging process according to some embodiments of the present disclosure. The process may include scanning an object 301; receiving data 302; processing data 303, and producing an image 304.

In step 301, an examination may be performed on an object. The object may be a human being, an animal, or a portion thereof including, for example, an organ, a texture, a lesion, a tumor, or the like, or any combination thereof. Merely by way for example, the object may include a head, a breast, a lung, a trachea, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. The object may be scanned by the imaging device 110. In some embodiments, the step 301 may be unnecessary.

In step 302, data may be received. In some embodiments, the data may be received by the data acquisition module 210. In some embodiments, the data may be received from the storage module 220. In some embodiments, the data may be received from an external data source via the network 170. In some embodiments, the data may be received from the input/output device 140.

In step 303, the data received in step 302 may be processed by a plurality of procedures. The data processing step 303 may be performed by the processing module 240. In some embodiments, a rectifying procedure may be performed to correct or remove any unreliable and incorrect data values. In some embodiments, a noise filtering procedure may be performed to remove the noise produced in the scanning step 301. In some embodiments, the processing procedure in step 303 may be based on an algorithm including, for example, Fourier slice theorem, filtered back projection algorithm, fan-beam reconstruction, iterative reconstruction, region growing algorithm, or the like, or any combination thereof.

In step 304, an image may be produced based on the data processed in step 303. The image producing step may be performed in the display module 230, and/or the processing module 240.

In some embodiments, steps 303 and 304 may be integrated into a single step. In some embodiments, after image producing step 304, the procedure may return to step 303, and the image may be further processed. In some embodiments, the data processing procedure and image producing procedure may be performed simultaneously. In some embodiments, one or more steps may be added to or deleted from the procedure. For example, a data storing step may be added between steps 302, 303, and/or 304.

It should be noted that the above description regarding FIG. 3 is merely an example, and should not be understood as the only embodiment. To those skilled in the art, after understanding the basic principles of the operations, the flowchart may be modified or varied without departing from the principles. The modifications and variations are still within the scope of the current application described above.

Figure 4A:
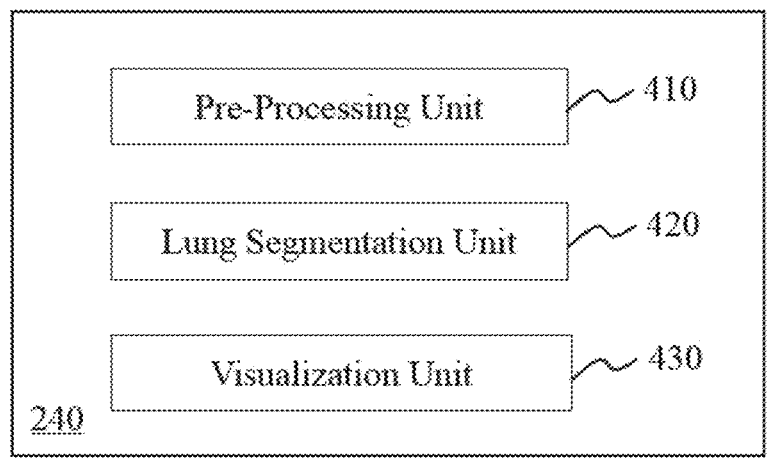
FIG. 4A is a block diagram of the processing module according to some embodiments of the present disclosure.

FIG. 4A is a block diagram of the processing module 240 according to some embodiments of the present disclosure. As shown in FIG. 4A, the processing module 240 may include a pre-processing unit 410, a lung segmentation unit 420, and a visualization unit 430. The pre-processing unit 410 may pre-process data. The data pre-processing may be used to make the data adaptive to segment. The data pre-processing may include image normalization, image reconstruction, image smoothing, suppressing, weakening and/or removing a detail, a mutation, a noise, or the like, or any combination thereof. In some embodiments, the pre-processing unit 410 may be unnecessary.

The lung segmentation unit 420 may segment different regions of a lung, for example, a lung region, a lung organ region, an airway region, and a lung tissue region. The lung region may refer to a region including a lung tissue, an airway, and/or a background. In some embodiments, the background may include information regarding matters or space outside a thorax, for example, between a human body and a table supporting the human body. In some embodiments, the background may include information regarding a tissue other than the lung tissue and the airway. For instance, a background may include a blood vessel, a rib, the heart tissue, the liver tissue, or the like, or any combination thereof. The lung organ region may refer to a region including a lung tissue and an airway. In some embodiments, the lung organ region does not include a background. The airway region may refer to a region including an airway. The airway may refer to a passage through which air passes to and from a lung. The lung tissue region may refer to a region including a lung interstitium, and a lung parenchyma excluding airways. For 3D image data, a region may include a plurality of voxels. For 2D image data, a region may include a plurality of pixels. For example, the lung region may include voxels depicting or corresponding to a lung. The lung organ region may include voxels depicting or corresponding to a lung organ. The airway region may include voxels depicting or corresponding to an airway. The lung tissue region may include voxels depicting or corresponding to a lung tissue.

In some embodiments, the lung segmentation unit 420 may include a plurality of programs. The programs may refer to an algorithm including, for example, Fourier slice theorem, filtered back projection algorithm, fan-beam reconstruction, iterative reconstruction, region growing algorithm, or the like, or any combination thereof.

The visualization unit 430 may visualize image data. The visualization unit 430 may transform the image data into a visual form, for example, a picture, a map, an image, etc. The visualized image may be displayed in the input/output device 140. The visualized image may be a grey scale image, or a colored graphics. The visualized image may be a 3D image, or 2D image. In some embodiments, the image data to be visualized may be obtained from the pre-processing unit 410, and/or the lung segmentation unit 420.

Figure 4B:
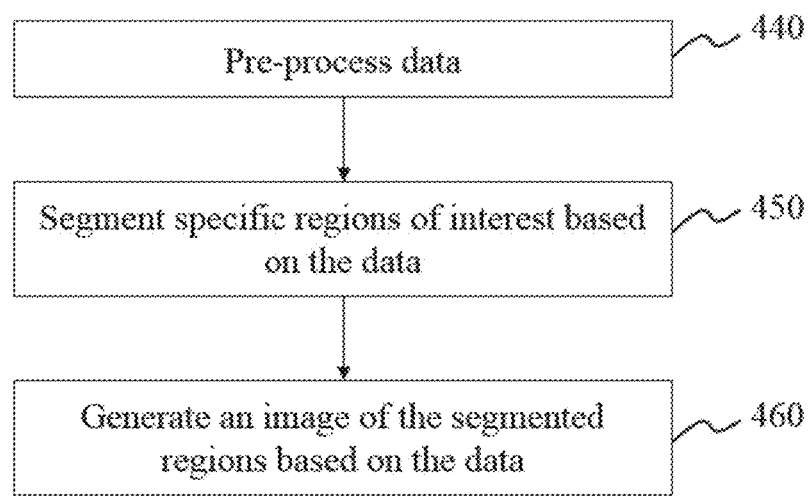
FIG. 4B is an exemplary flowchart illustrating a data processing procedure according to some embodiments of the present disclosure.

FIG. 4B is an exemplary flowchart illustrating a data processing procedure according to some embodiments of the present disclosure. As illustrated, the data processing procedure may include pre-processing data, segmenting specific regions of interest, and generating an image.

As illustrated in step 440, data may be pre-processed. Data pre-processing may be performed by the pre-processing unit 410. Data pre-processing may include performing an image smoothing and an enhancing. The smoothing process may be in a spatial domain and/or a frequency domain. In some embodiments, the spatial domain smoothing method may process the image pixel and/or voxel directly. The frequency domain smoothing method may process a transformation value based on an image, and then inverse transform the transformation value into a space domain. The imaging smoothing method may include a median smoothing, a Gaussian smoothing, a mean smoothing, a normalized smoothing, a bilateral smoothing, or the like, or any combination thereof.

In step 450, specific regions of interest may be segmented based on the data pre-processed in step 440. The segmentation step 450 may be performed by the lung segmentation unit 420. The segmentation step 450 may be based on one or more algorithms. In some embodiments, the segmentation algorithms may include a threshold segmentation, a region growing segmentation, an energy-based 3D reconstruction segmentation, a level set-based segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. In some embodiments, the segmentation algorithms may be stored in the lung segmentation unit 420, the storage module 220, or other mobile storage device (e.g. a mobile hard disk, a USB flash disk, or the like, or any combination thereof). In some embodiments, the segmentation algorithms may be retrieved from one or more other external sources via the network 170.

In step 460, an image may be generated based on the regions segmented in step 450. The image generation step 460 may be performed by the visualization unit 430. In some embodiments, a colored image of the segmented regions may be generated. In some embodiments, a grey level image of the segmented regions may be generated. In some embodiments, the image generation step may include a post-processing step. The post-processing step may be based on techniques including, for example, a 2D post-processing technique, a 3D post-processing technique, or the like, or a combination thereof. Exemplary 2D post-processing techniques may include a multi-planar reformation (MPR), a curved planar reformation (CPR), a computed volume reconstruction (CVR), a volume rendering (VR), or the like, or any combination thereof. Exemplary 3D post-processing technique may include a 3D surface reconstruction, a 3D volume reconstruction, a volume intensity projection (VIP), a maximum intensity projection (MIP), a minimum intensity projection (Min-IP), an average intensity projection (AIP), an X-ray simulation projection, a volume rendering (VR), or the like, or any combination thereof. Other techniques may include a repair process, a render process, a filling process, or the like, or any combination thereof.

It should be noted that the above description about the processing module 240 and relevant flowchart is merely an example, and should not be understood as the only embodiment. To those skilled in the art, after understanding the basic principles of the connection between different units, the units and connection between the units may be modified or varied without departing from the principles. The modifications and variations are still within the scope of the current application described above. In some embodiments, these units may be independent, and in some embodiments, part of the units may be integrated into one unit to work together. For example, the pre-processing unit 410, and/or the data pre-processing step 440 may be unnecessary. As another example, steps 440 and 450 may be integrated into a single step. As still another example, the steps 450 and 460 may be performed simultaneously, or alternately.

Figure 5:
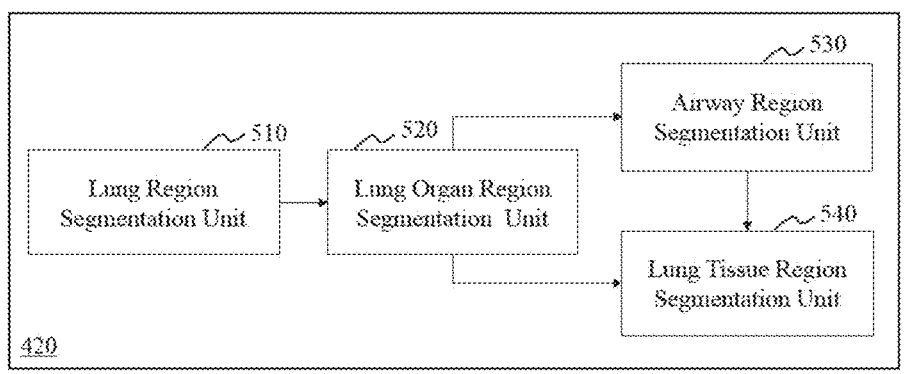
FIG. 5 is a block diagram of the lung segmentation unit according to some embodiments of the present disclosure.

FIG. 5 is a block diagram of the lung segmentation unit 420 according to some embodiments of the present disclosure. In some embodiments, the lung segmentation unit 420 may include a lung region segmentation unit 510, a lung organ region segmentation unit 520, an airway region segmentation unit 530, and a lung tissue region segmentation unit 540. In some embodiments, the lung region segmentation unit 510 may segment a lung region. The lung region may be segmented based on a plurality of data. The data may be 3D data, and/or 2D data. In some embodiments, the data used for lung region segmentation may be CT image data, PET image data, and/or MRI image data. In some embodiments, the data may be related with a human body of interest, for example, the data of a whole body, a trunk, a thorax, a lung region, or the like, or any combination thereof. The data may be generated from the pre-processing unit 410, the data acquisition module 210, the storage module 220, the display module 230, and/or the network 170. In some embodiments, the lung region segmentation unit 510 may include a storage (not shown) for storing a plurality of programs including, for example, Fourier slice theorem, filtered back projection algorithm, fan-beam reconstruction, iterative reconstruction, region growing algorithm, or the like, or any combination thereof.

In some embodiments, the lung organ region segmentation unit 520 may segment a lung organ region. The lung organ region may be segmented based on a plurality of data. In some embodiments, the data may be acquired from the lung region segmentation unit 510. In some embodiments, the lung region segmentation unit 510 may include a storage (not shown) for storing a plurality of algorithms including, for example, Fourier slice theorem, filtered back projection algorithm, fan-beam reconstruction, iterative reconstruction, region growing algorithm, or the like, or any combination thereof.

In some embodiments, the airway region segmentation unit 530 may segment an airway region. In some embodiments, the airway may include a bronchial tree. The bronchial tree may include a bronchus, a bronchiole, and an alveolus. The bronchus may be one of the two main bronchi of the trachea. The trachea may have a long tube structure and descend from a throat down to a thoracic cavity. For a main bronchus, it may branch into secondary bronchi. A secondary bronchus may further branch into tertiary bronchi. A tertiary bronchus may branch into terminal bronchioles. An alveolus including a duct and an air sac may allow gas exchange with the blood. In some embodiments, the bronchial tree may be divided into several levels according to its division conduction. Merely by way of example, the number of levels may be any value within the range of 10 to 24. For example, in an airway segmentation, the number of levels may be set according to some specific demands. In some embodiments, the bronchial tree may also branch into low-level bronchi and terminal bronchioles.

For illustration purposes, an exemplary embodiments of a 13-level bronchial tree may be described below. The low-level bronchus, compared to a terminal bronchiole, may include one or more levels toward a main bronchus, e.g., 1 to 3 levels, 1-4 levels, 1-5 levels, or other variations. The terminal bronchioles may include one or more levels toward alveoli, e.g., 4-13 levels, 5-13 levels, 6-13 levels or other variations. It should be noted that the division of the low-level bronchi and the terminal bronchioles is not limited here and the above embodiments are merely for illustration purposes and not intended to limit the scope of the present disclosure.

In some embodiments, the airway region may include a first-level airway, and/or a second-level airway. In some embodiments, the first-level airway may refer to a low-level bronchus, and the second-level airway may refer to a terminal bronchiole. The first-level airway may refer to an airway with a relatively large tube diameter, and relatively fewer branches; the second-level airway may refer to the sub branches of the first-level airway. For example, the relatively low level of airway in the low-level bronchi toward a main bronchus may be regarded as a first-level airway, while the relatively high level of airway in the low-level bronchi toward an alveolus may be regarded as a second-level airway. As another example, the relatively low level of airway in the terminal bronchiole may be regarded as a first-level airway, while the relatively high level of airway in the terminal bronchiole may be regarded as a second-level airway.

The airway region segmentation may be based on a plurality of data. In some embodiments, the data may be generated from the lung organ region segmentation unit 520, or the lung region segmentation unit 510.

In some embodiments, the lung tissue region segmentation unit 540 may segment a lung tissue region. In some embodiments, the lung tissue may further include a left lung tissue, and a right lung tissue. The lung tissue region may be segmented based on a plurality of data. In some embodiments, the data may be obtained from the lung organ region segmentation unit 520 and/or the airway region segmentation unit 530. In some embodiments, the lung tissue region segmentation unit 540 may include a storage (not shown) for storing a plurality of algorithms including, for example, Fourier slice theorem, filtered back projection algorithm, fan-beam reconstruction, iterative reconstruction, region growing algorithm, or the like, or any combination thereof.

It should be noted that the above description regarding FIG. 5 is merely an example, and should not be understood as the only embodiment. To those skilled in the art, after understanding the basic principles of the connection between different units, the units and connection between the units may be modified or varied without departing from the principles. The modifications and variations are still within the scope of the current application described above. In some embodiments, these units may be independent, and in some embodiments, part of the units may be integrated into one unit to work together. For example, the algorithms employed in the lung region segmentation unit 510, the lung organ region segmentation unit 520, the airway region segmentation unit 530, and/or the lung tissue region segmentation unit 540 may be obtained from the storage module 220, a software (including firmware, resident software, micro-code, etc.), or an external source, for example, via the network 170.

Figure 6:
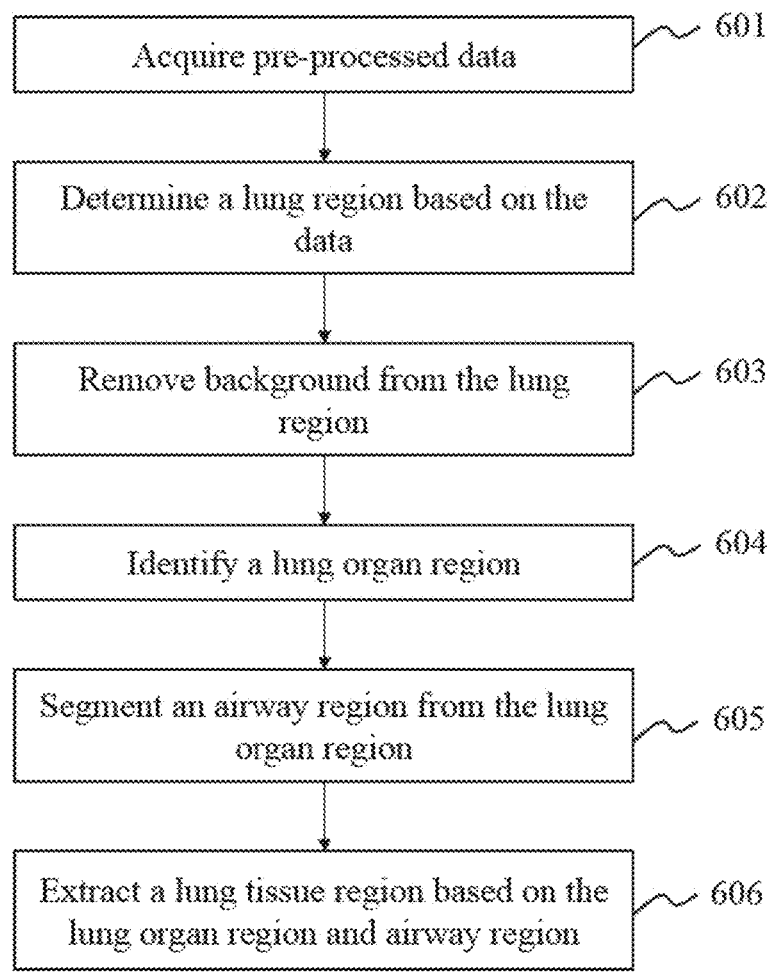
FIG. 6 is a flowchart illustrating an exemplary process for lung segmentation according to some embodiments of the present disclosure.

FIG. 6 is a flowchart illustrating an exemplary process for lung segmentation according to some embodiments of the present disclosure. As used herein, an exemplary process of lung segmentation may include acquiring pre-processed data, determining a lung region, removing background from the lung region, identifying a lung organ region, segmenting an airway region, and extracting a lung tissue region. One or more segmentation methods may be used in airway region segmentation.

As illustrated in step 601, data may be acquired. The data acquisition step may be performed by the lung region segmentation unit 510, and/or the data acquisition module 210. In some embodiments, the acquired data may be pre-processed in the pre-processing unit 410. In some embodiments, the data may be acquired from the pre-processing step 440. In some embodiments, the data may be acquired from an external data source, for example, via a network 170. The acquired data may be CT image data, PET image data, MRI image data, etc. The data acquired may be 3 dimensional (3D) image data, and/or 2 dimensional (2D) image data. For 3D image data, the data may relate to a voxel. For 2D image data, the data may relate to a pixel. In some embodiments, the acquired data may relate to a human body or a portion thereof including, for example, the data of a whole body, a trunk, a thorax, a lung region, a non-lung region, or the like, or any combination thereof. As used herein, a non-lung region may refer to a region which does not include a tissue being part of a lung, for example, a lung tissue, a lung organ, an airway, or the like, or any combination thereof.

In step 602, a lung region may be determined based on the data acquired in step 601. In step 602, the lung region determination may be performed by the lung region segmentation unit 510. The lung region may include a lung tissue, an airway, and/or a background. The lung region may be determined using one or more segmentation methods or algorithms described elsewhere in the present disclosure. In some embodiments, a threshold based method may be used. A threshold may be determined according to the data acquired in step 601. In some embodiments, the threshold may be determined using a "maximum between-class variance method" (also referred to as the OTSU's method). According to the OTSU's method, an image may contain two classes of pixels (e.g., foreground pixels and background pixels); a threshold separating the two classes may be determined so that their intra-class variance may be minimal or equivalent, and their inter-class variance may be maximal. Whether a portion of the data belong to the lung region may be determined by comparing the portion of the data value with the threshold. For example, if the data value of the portion is larger than the threshold, the portion of the data may be determined as belonging to the lung region. The data determined as belonging to the lung region may be extracted, and a lung region may be defined. For example, the CT value on the Hounsfield scale of a human tissue may be generally within the range of $(-200, \infty)$, and the CT value of the lung region may be generally within the range of $(-1000, -400)$. Using the OTSU's method, a threshold may fall within the range of $(-600, -400)$. Using the threshold method, the non-lung tissue of a human body may be distinguished from the tissue relating to a lung including a lung organ, an airway, a lung tissue, and/or a background.

In step 603, a background may be removed from the lung region determined in step 602. The background removing step may be performed by the lung region segmentation unit 510, and/or the lung organ region segmentation unit 520. In some embodiments, the removed background may include space between a human body and a table supporting the human body in the imaging device. The background may be removed based on 3D or 2D image data. The background may be removed using one or more methods described elsewhere in the present disclosure.

In some embodiments, a region growing method may be used. For example, one or more seeds may be identified near an edge of a 2D layer of a 3D or 2D image, and region growing may be performed based on the seeds from the edge to the center of the 2D layer. In some embodiments, the region growing may be performed based on the neighboring voxels (e.g., 4-neighboring voxels) of a seed. The region growing method may identify the background including space between a human body and a table supporting the human body in the imaging device. Thus, a missed or false identification of the background may be revealed or prevented. In some embodiments, a seed identified for region growing may have a specific value. For example, for a CT image, a seed with a CT value on the Hounsfield scale within the range of (a, −600) may be identified, in which a may refer to the minimum CT value among the 3D or 2D image data acquired in step 601. In some embodiments, one or more 2D layers may be extracted from 3D image data, and the background in the 2D layers may be identified. For example, 20 2D layers may be extracted from a 3D image which has totally 100 2D layers. In some embodiments, the extraction of 2D layers from a 3D image or 3D image data may be performed at an interval. For instance, a 2D layer of every 5-20 layers is extracted from a 3D image or 3D image data.

In step 604, a lung organ region may be identified. The lung organ region identification process may be performed by the lung organ region segmentation unit 520. The identified lung organ region may include a lung tissue, and/or an airway. The lung region may be determined using one or more segmentation methods described elsewhere in the present disclosure. In some embodiments, a 3D region growing method may be used in the lung organ region identification. More details regarding lung organ region identification are provided elsewhere in the present disclosure at, for example, FIG. 7A and the description thereof.

In step 605, an airway region may be segmented from the identified lung organ region in step 604. The airway region segmentation may be performed by the airway region segmentation unit 530. The airway region segmented may include a first-level airway, a second-level airway, an airway tree, or the like, or any combination thereof. The airway region may be segmented using one or more segmentation methods described elsewhere in the present disclosure. In some embodiments, a seed may be identified as an initial step of the airway region segmentation. The seed may be a pixel or voxel defining an initial position for growing, and/or a starting point for curve evolution (e.g., in level set algorithm). In some embodiments, the seed may be identified automatically without a user (e.g., an operator of the imaging device) intervention. For example, the seed may be automatically identified in a starting 2D layer. The starting 2D layer may refer to a 2D layer where the area of an airway is larger than a threshold (e.g., 2 square millimeters). To identify the starting 2D layer, one or more of the 2D layers in a 3D image may be determined, and the 2D layers may be detected from upstream to downstream. A 2D layer may provide a transverse view of a lung or related regions. As used herein, an upstream layer may refer to a layer including an airway with a relatively large diameter or few branches. A downstream layer may refer to a layer including an airway with a relatively small diameter or many branches. Then the area of an airway within a 2D layer may be calculated. If the area of a 2D layer is larger than a threshold, the 2D layer may be identified as the starting 2D layer. In some embodiments, the seed may be identified as the center of the airway in the starting 2D layer. In some embodiments, the airway region segmentation may include multiple extractions. For example, a first-level airway extraction (FIG. 11A and FIG. 11B), and a second-level airway extraction (FIG. 12A and FIG. 12B). In some embodiments, the second-level airway extraction may be based on the first-level airway extraction. Exemplary procedure for airway region segmentation is provided elsewhere in the present disclosure at, for example, FIG. 9 and the description thereof.

In step 606, a lung tissue region may be extracted based on a lung organ region identified in step 604 and an airway region segmented in step 605. The lung tissue region extraction may be performed by the lung tissue region segmentation unit 540. In some embodiments, a lung tissue region may be extracted by removing an airway region from a lung organ region. In some embodiments, the lung tissue may include a left lung tissue, and/or a right lung tissue. In some embodiments, the left lung tissue and/or the right lung tissue may be labeled. As used herein, "label" may refer to a procedure to mark or distinguish something from the surroundings in an image. In some embodiments, the left lung tissue may appear connected to the right lung tissue in the image. This appearance may be due to one or more imaging effects including, for example, a "partial volume effect."

In some embodiments, the left lung tissue and/or the right lung tissue may be labeled after the lung tissue region extraction. In some embodiments, the left lung tissue and/or the right lung tissue may be labeled before the lung tissue region extraction, for example, after a first-level airway region segmentation, and/or before a second-level airway region segmentation. In some embodiments, the labelling for the left lung tissue and/or the right lung tissue may be based on a first-level airway region. More details regarding left/right lung tissue labelling are provided elsewhere in the present disclosure at, for example, FIG. 7B and the description thereof.

It should be noted that the above description regarding FIG. 6 is merely provided for the purposes of illustration, and not intended to limit the scope of the present disclosure. For persons having ordinary skills in the art, multiple variations or modifications may be made under the teachings of the present disclosure. For example, an airway region may be segmented from a lung region, which means the lung organ region identification step 604 may be unnecessary. As another example, a first-level airway region may be segmented in step 605, and then a left/right lung tissue region may be labeled in step 606, afterwards a second-level airway region may be segmented in step 605, which means steps 605 and 606 may be performed alternately.

Figure 7A:
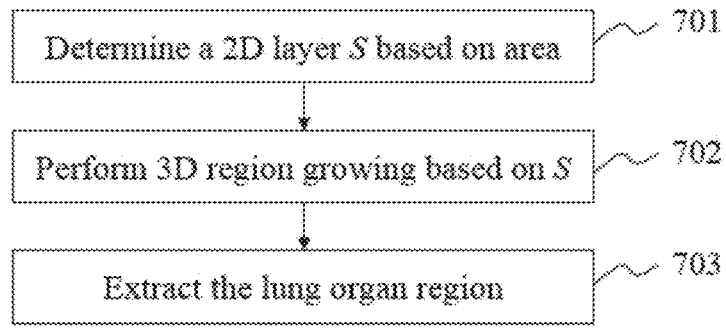
FIG. 7A provides a flowchart illustrating an exemplary process for lung organ region identification according to some embodiments of the present disclosure.
Figure 7B:
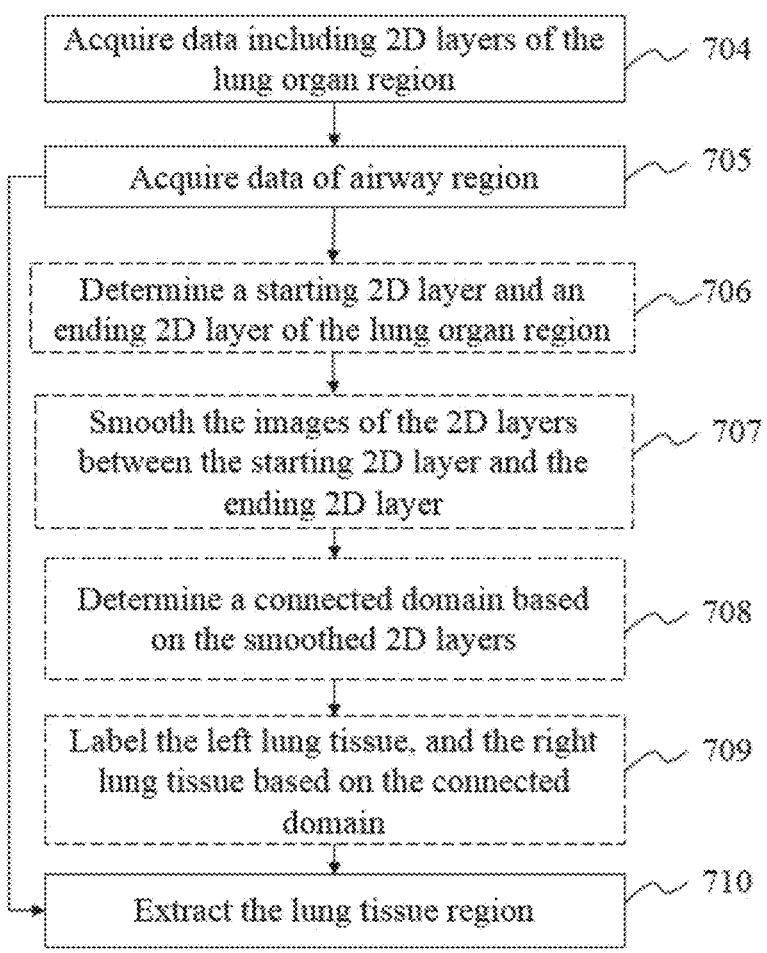
FIG. 7B provides a flowchart illustrating an exemplary process for lung tissue region extraction according to some embodiments of the present disclosure.

FIG. 7A and FIG. 7B provide two flowcharts illustrating exemplary processes for lung organ region identification (step 604) and lung tissue region extraction (step 606) according to some embodiments of the present disclosure. The flowchart in FIG. 7A illustrates an exemplary process for lung organ region identification. In some embodiments, a 3D region growing method may be used in the lung organ region identification. A seed or a seed layer may be determined for 3D region growing. The seed layer may refer to a layer that includes a seed. The seed may be determined based on the lung region. In some embodiments, background has been removed from the lung region. As illustrated in step 701, a 2D layer S providing a transverse view may be determined based on an area of a lung region in the 2D layer S. In some embodiments, the area of a lung organ in a 2D layer may be calculated, and a layer with a maximal lung organ area $S_{max}$ may be determined as the seed layer. In some embodiments, the seed layer may be unnecessarily the 2D layer with $S_{max}$, a 2D layer S with relatively large area, or a 2D layer with an area approaching $S_{max}$ may be determined as the seed layer. In some embodiments, two or more 2D layers may be determined as seed layers. In step 702, 3D region growing may be performed based on the 2D layer S. 3D region growing may refer to a growing process in 3 dimensional space based on one or more seeds identified in the 2D layer S. One or more voxels (or pixels) adjacent to a seed may be examined. The adjacent voxel (or pixel) may include a voxel (or pixel) in a 2D layer adjacent to the 2D layer S. In some embodiments, an adjacent voxel (or pixel) of an initial seed or an initial seed layer may be examined such that a determination may be made as to whether the adjacent voxel belongs to the lung organ region. In some embodiments, the determination may be based on a fixed or a variable threshold. A variable threshold may be self-adaptive. For instance, the threshold may be adjusted automatically based on the seed and/or a voxel (or pixel) adjacent to the seed. In some embodiments, the 3D region growing method may be based on a characteristic or a feature including a gray level, a mean gray level, an intensity, a texture, a color, a contrast, a brightness, or the like, or any combination thereof. After 3D region growing, a connected domain may be formed. In step 703, the lung organ region may be extracted. In some embodiments, the connected domain formed in step 702 may be representative of a lung organ region in the 3D image data acquired in step 601.

The flowchart in FIG. 7B illustrates an exemplary process for lung tissue region extraction. In some embodiments, data including 2D layers of the lung organ region may be acquired in step 704. The 2D layers may provide transverse views of the lung organ region. The data may be acquired from a lung organ region identified in step 604, or extracted in step 703. In some embodiments, data of an airway region may be acquired in step 705. The data acquired may be of a first-level airway and/or a second-level airway. In some embodiments, the process may proceed to step 710. In step 710, a lung tissue region may be extracted from the data of the lung organ region by removing the data of an airway region including the first-level airway, and/or the second level airway. In some embodiments, a left lung tissue, and/or a right lung tissue may be labelled before the extraction step 710. In some embodiments, the labelling for the left lung tissue and/or the right lung tissue may be based on the first-level airway region, and/or the lung organ region acquired in step 704. For example, a region may be extracted by removing the first-level airway region from the lung organ region, and the labelling process may be performed based on the extracted region. As illustrated in step 706, a starting 2D layer and an ending 2D layer of the lung organ may be determined. The 2D layers acquired in step 704 may be detected from upstream to downstream to search for the starting 2D layer of the lung organ region. If a lung organ region is detected in a 2D layer, the 2D layer may be determined as the starting 2D layer of the lung organ, and the searching for the starting 2D layer may be terminated. Then the 2D layers acquired in step 704 may be detected from downstream to upstream to search for the ending 2D layer of the lung organ. If a lung organ region is detected in a 2D layer, the 2D layer may be determined as the ending 2D layer of the lung organ, and the searching for the ending 2D layer of the lung organ may be terminated. Then the images in the 2D layers between the starting 2D layer and the ending 2D layer may be smoothed in step 707. A connected domain may be determined based on the smoothed 2D layer in step 708. Then the left lung tissue, and the right lung tissue may be labelled based on the connected domain in step 709. In some embodiments, the steps 707 through 709 may be performed based on a morphology based method. In some embodiments, processing speed in steps 707 through 709 may be accelerated by determining the starting 2D layer and the ending 2D layer in step 706 to reduce the number of 2D layers to be processed, considering that some of the 2D layers acquired in step 704 are deemed to be beyond the starting 2D layer and the ending 2D layer and therefore not processed in step 707 and subsequent steps. Afterwards, the process may proceed to step 710.

It should be noted that the above description of the flowcharts in FIG. 7A and FIG. 7B is merely provided for the purposes of illustration, and not intended to limit the scope of the present disclosure. For persons having ordinary skills in the art, multiple variations or modifications may be made under the teachings of the present disclosure. For example, step 706 may be unnecessary for labelling the left/right lung tissue. As another example, labelling the left/right lung tissue is unnecessary. As still another example, steps 706 through 709 may be unnecessary if labelling the left/right lung tissue is unnecessary. As still another example, data regarding a first-level airway region acquired in step 705 may be used in step 709.

Figure 8:
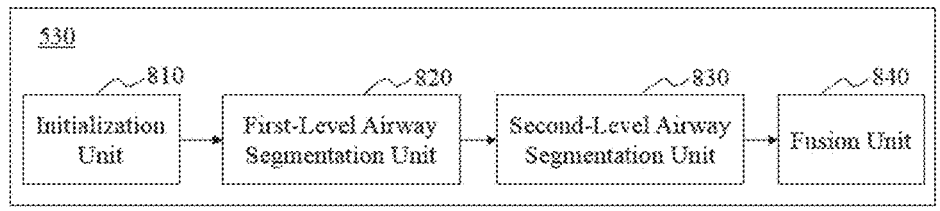
FIG. 8 is a block diagram illustrating an airway region segmentation unit according to some embodiments of the present disclosure.

FIG. 8 is a block diagram illustrating an airway region segmentation unit 530 according to some embodiments of the present disclosure. The airway region segmentation unit 530 may determine one or more regions regarding an airway. The airway may refer to a system of an airway tree (or windpipes) that allows air to pass to and from a lung.

As illustrated in FIG. 8, the airway region segmentation unit 530 may include an initialization unit 810, a first-level airway segmentation unit 820, a second-level airway segmentation unit 830, and a fusion unit 840. The initialization unit 810 may be configured to initialize information regarding airway segmentation. In some embodiments, the information to be initialized may include the data of a region to be segmented, parameters to be used in segmentation, and/or conditions to be satisfied in segmentation. The initialized data may include the data of a lung organ region, or the data of a lung region. The initialized parameters may include a threshold, a characteristic, a CT value, a region of interest, a seed, an equation, an algorithm, or the like, or any combination thereof. The conditions initialized may include the iteration times, a termination condition to end a process, or the like, or any combination thereof.

The first-level airway segmentation unit 820 may be configured to extract a first-level airway. The first-level airway may be found in or extracted from a lung region, a lung organ region, a low-level bronchi and a terminal bronchiole, according to the data initialized in the initialization unit 810. In some embodiments, one or more first-level airways may be extracted. In some embodiments, the extracted first-level airway may belong to one or more airway trees. In some embodiments, the extracted first-level airway may be connected with each other or not.

The second-level airway segmentation unit 830 may be configured to extract a second-level airway. The second-level airway may be found in or extracted from a lung region, a lung organ region, a low-level bronchi, and a terminal bronchiole, according to the data initialized in the initialization unit 810. In some embodiments, one or more second-level airways may be extracted. In some embodiments, the extracted second-level airway may belong to one or more airway trees. In some embodiments, the extracted second-level airway may be connected with each other or not.

The fusion unit 840 may be configured to fuse a first-level airway and a second-level airway together to generate an airway. The airway generated may be a trachea, a low-level bronchi, a terminal bronchiole, or a bronchial tree. In some embodiments, the fusion unit 840 may fuse two or more first-level airways into one first-level airway. In some embodiments, the fusion unit 840 may fuse two or more second-level airways into one second-level airway. In some embodiments, the fusion unit 840 may fuse a first-level airway with a second-level airway. In some embodiments, the first-level airway to be fused may be extracted in the first-level airway segmentation unit 820. In some embodiments, the second-level airway to be fused may be extracted in the second-level airway segmentation unit 830. In some embodiments, the first-level airway and/or the second-level airway to be fused may be acquired from an external data source, for example, via a network 170.

It should be noted that the above description regarding FIG. 8 is merely an example, and should not be understood as the only embodiment. To those skilled in the art, after understanding the basic principles of the operations, the flowchart may be modified or varied without departing from the principles. The modifications and variations are still within the scope of the current application described above.

Figure 9:
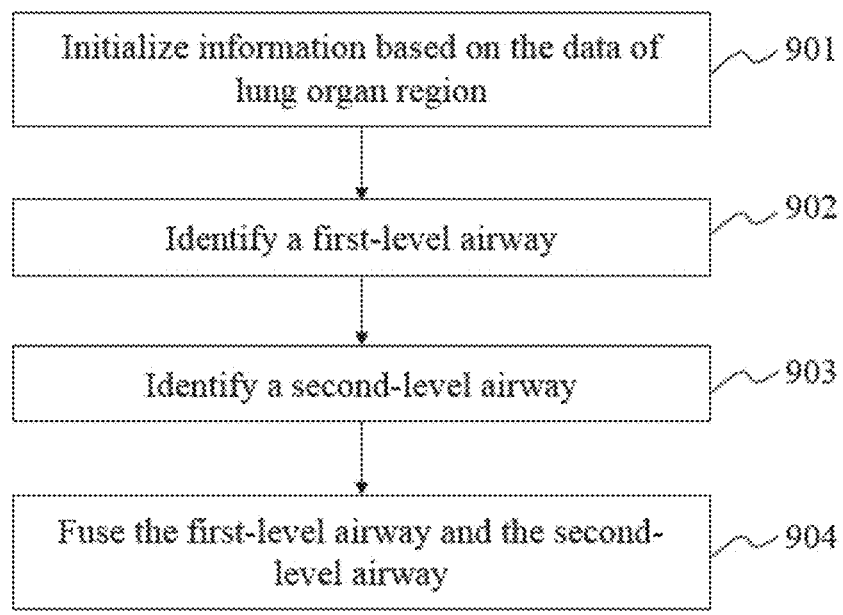
FIG. 9 is a flowchart illustrating an exemplary process for airway region segmentation according to some embodiments of the present disclosure.

FIG. 9 is a flowchart illustrating an exemplary process for airway region segmentation according to some embodiments of the present disclosure. As illustrated here, an exemplary process of airway region segmentation may include initializing, identifying a first-level airway, identifying a second-level airway, and fusing the first-level airway and the second-level airway. One or more segmentation methods may be used in airway region segmentation.

As illustrated in step 901, information based on the data of a lung organ region may be initialized. The initialization step may be performed by the initialization unit 810. In some embodiments, information to be used in the following steps 902, 903, and 904 may be initialized. Exemplary information may include a threshold value, an equation, an algorithm, or the like, or any combination thereof. In some embodiments, the data of a lung organ region may refer to a plurality of 3D data. In some embodiments, the 3D data may be divided into a plurality of 2D data. The 2D data may refer to the data on a 2D layer of the lung organ region. The 2D layer may provide a transverse view, a sagittal view, or a coronal view of the lung organ region. In some embodiments, a seed may be identified among the 3D and/or 2D data. In some embodiments, information regarding the operation state of the process may be initialized, including, for example, the desired iteration times, a termination condition to end a process, or the like, or any combination thereof. The initialization step may be performed in an automatic manner or an interactive manner. For example, some information may be inputted or identified by a user (e.g., an operator of the imaging device) via the input/output device 140.

In step 902, a first-level airway may be identified. The first-level airway identification step may be performed by the first-level airway segmentation unit 820. The first-level airway may be identified based on the data of a lung organ region initialized in step 901. The first-level airway may be identified using a segmentation method described elsewhere in the present disclosure. In some embodiments, a region growing based method may be used. Region growing may include judging whether a voxel (or pixel) adjacent to a seed meets a fused standard under a fixed or a variable threshold. A variable threshold may be self-adaptive. For instance, the threshold may be adjusted automatically based on the seed and/or a voxel (or pixel) adjacent to the seed. An exemplary processing procedure using region growing method may be provided by FIG. 11A. In some embodiments, a level set based method may be used. The level set method may utilize dynamically variable boundaries for an image segmentation, embedding active contours of the variable boundaries into time-dependent partial differential equations. An exemplary processing procedure using level set method may be provided by FIG. 11B. In some embodiments, a morphology based method may be used. Morphology based method may utilize a series of filters. More descriptions regarding morphology based method may be found in, for example, C. Pisupati, L. Wolff, W. Mitzner, and E. Zerhouni, "Segmentation of 3-D pulmonary trees using mathematical morphology," in Proc. Math. Morphol. Appl. Image Signal Process, May 1996, pp. 409-416, the contents of which are hereby incorporated by reference.

In step 903, a second-level airway may be identified. The second-level airway identification step may be performed by the second-level airway segmentation unit 830. The second-level airway may be identified based on the data of a first-level airway identified in step 902. The second-level airway may be identified using a segmentation method described elsewhere in the present disclosure. In some embodiments, an energy-based 3D reconstruction method may be used. The energy-based 3D reconstruction may be a growing method based on a constraint to minimize local energy. An exemplary processing procedure using energy-based 3D reconstruction method is provided in FIG. 12A and the description thereof. In some embodiments, a level set based method may be used. An exemplary processing procedure using level set method is provided in FIG. 12B and the description thereof.

In step 904, a first-level airway and a second-level airway may be fused together. The fusion step may be performed by the fusion unit 840. In some embodiments, the fusion process may be based on the first-level airway identified in step 902 and the second-level airway identified in step 903. In some embodiments, the fusion process may be based on a first-level airway or a second-level airway acquired from other sources, for example, the storage module 220, the network 170, etc. In some embodiments, the fusion method may include a spatial domain fusion and a transform domain fusion. In some embodiments, the fusion method may include a high pass filtering technique, a HIS transform based image fusion, a PCA based image fusion, a wavelet transform image fusion, a pair-wise spatial frequency matching, or the like, or any combination thereof.

It should be noted that the above description of the flowchart in FIG. 9 is merely provided for the purposes of illustration, and not intended to limit the scope of the present disclosure. For persons having ordinary skills in the art, multiple variations or modifications may be made under the teachings of the present disclosure. For example, one or more initialization steps may be added in step 902 and/or step 903. As another example, an intermediate process step may be added between the steps 902 and 903.

Figure 10:
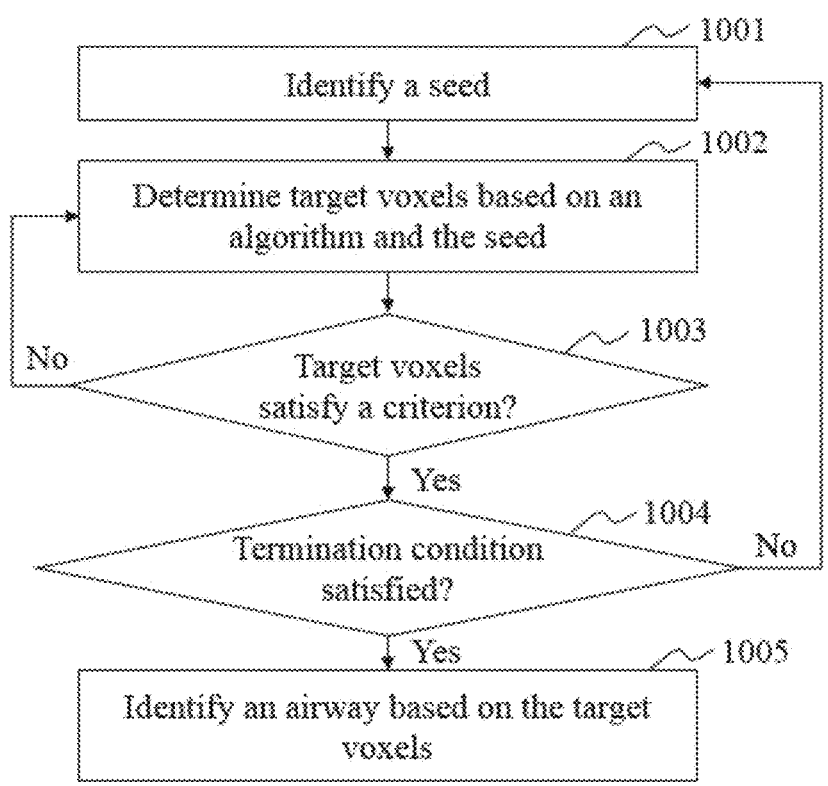
FIG. 10 provides a flowchart illustrating an exemplary process for first-level airway extraction and/or second-level airway extraction according to some embodiments of the present disclosure.

FIG. 10 provides a flowchart illustrating an exemplary process for first-level airway extraction and/or second-level airway extraction according to some embodiments of the present disclosure. In some embodiments, a seed may be identified at the beginning of extraction. As illustrated in step 1001, a seed may be identified. In some embodiments, the seed for first-level airway extraction and/or second-level airway extraction may be different. The seed for the first-level airway extraction may be called the first-level seed, while the seed for the second-level airway extraction may be called the second-level seed. For example, in the first-level airway extraction, the first-level seed may be identified based on the data of a first-level airway region, a lung organ region, and/or a lung region. As another example, in the second-level airway extraction, the second-level seed may be identified based on the data of a first-level airway region. In some embodiments, the seed may be identified according to one or more newly determined voxels that belongs to an airway. For example, the target voxels satisfying a criterion in step 1003 may be determined as belonging to an airway, and on or more voxels among the target voxels may be identified as the seed.

In step 1002, target voxels may be determined based on an algorithm and the seed identified in step 1001. The target voxels may refer to the voxels which may belong to an airway. In some embodiments, the algorithm used in step 1002 may refer to an segmentation algorithm including, for example, a threshold segmentation, a region growing segmentation, an energy-based 3D reconstruction segmentation, a level set-based segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. In some embodiments, the algorithm may be performed manually, semi-automatically, or automatically. The three manners (i.e., manual, semi-automatic, and automatic manner) may provide different choices to a user or an operator and allow the user or the operator to participate in the extraction process in various degrees. In some embodiments, a parameter of the algorithm may be provided by the user or the operator. The parameter may be a threshold level, a homogeneity criterion, a function, an equation, a model, or the like, or any combination thereof. In some embodiments, the algorithm may use some information including, e.g., a priori information, an optimized method, an expert-defined rule, a model, or the like, or any combination thereof. The information may also be updated by way of, for example, self-learning. In some embodiments, the user or the operator may supervise the process in a certain level. By doing this, target voxels may be determined. For a specific seed, the determination process for target voxels may be treated as one cycle. In some embodiments, one cycle may include one or more iterations.

In step 1003, whether the target voxels satisfy a criterion may be judged. In some embodiments, one or more criteria may be used for judgement. The criteria may refer to a restrictive condition distinguishing a true target voxel that belongs to an airway from a false target voxel that does not belong to an airway. In some embodiments, the criteria may be used to prevent a "leakage." A leakage may occur when target voxels outside an airway tube are determined as belonging to the airway. For example, when a voxel outside an airway tube and located in lung parenchyma is determined as belonging to an airway, a parenchymal leakage may occur. The criteria may include a threshold. In some embodiments, the threshold may relate to the target voxels, for example, the voxel count of the target voxels. In some embodiments, the criteria may relate to a comparison, for example, the comparison between the voxel count of the target voxels and that of an airway that may include the seed. In some embodiments, the criteria may relate to a user intervention. For example, the target voxels may be presented to a user through the input/output device 140, and the user may determine whether the target voxels are true or not. If the criterion is satisfied, the target voxels may be added to an airway, and the process may proceed to step 1004. Otherwise, the target voxels may be removed, and the process may return to step 1002. In some embodiments, the target voxels not satisfying the criteria may be partially or entirely removed. As illustrated here, the removal of target voxels may not necessarily refer to the deletion of the voxels from the data of the lung organ region, or the lung region. The removal of target voxels may indicate that the target voxels may be marked or designated as not belonging to an airway.

In step 1004, whether the process satisfies a termination condition may be judged. In some embodiments, the termination condition may relate to the target voxels. For example, whether the voxel count of the target voxels satisfy a threshold. In some embodiments, the termination condition may relate to a parameter in the processing. For example, the termination condition may relate to a processing time for an algorithm, cycle times, or iteration times. In some embodiments, the termination condition may relate to a user intervention. For example, the target voxels may be presented to a user through the input/output device 140, and the user may determine whether to end the process or not. If the termination condition is satisfied, the process may proceed to step 1005. Otherwise, the process may return to step 1001, and a new seed may be identified. In some embodiments, the new seed may be identified based on one or more target voxels that satisfy the criterion in step 1003. For instance, one or more target voxels satisfying the criterion in step 1003 may be used as new seeds in further steps of the process.

In step 1005, an airway may be identified. The airway may be identified base on the target voxels satisfying the criteria in step 1003. The airway identified may be a first-level airway or a second-level airway, according to the seed identified in step 1001.

It should be noted that the above description of the flowchart in FIG. 10 is merely provided for the purposes of illustration, and not intended to limit the scope of the present disclosure. For persons having ordinary skills in the art, multiple variations or modifications may be made under the teachings of the present disclosure. For example, between steps 1003 and 1004, a plurality of steps may be added to further process the target voxels determined in step 1002, or to determine whether the target voxels satisfy other criteria.

Figure 11A:
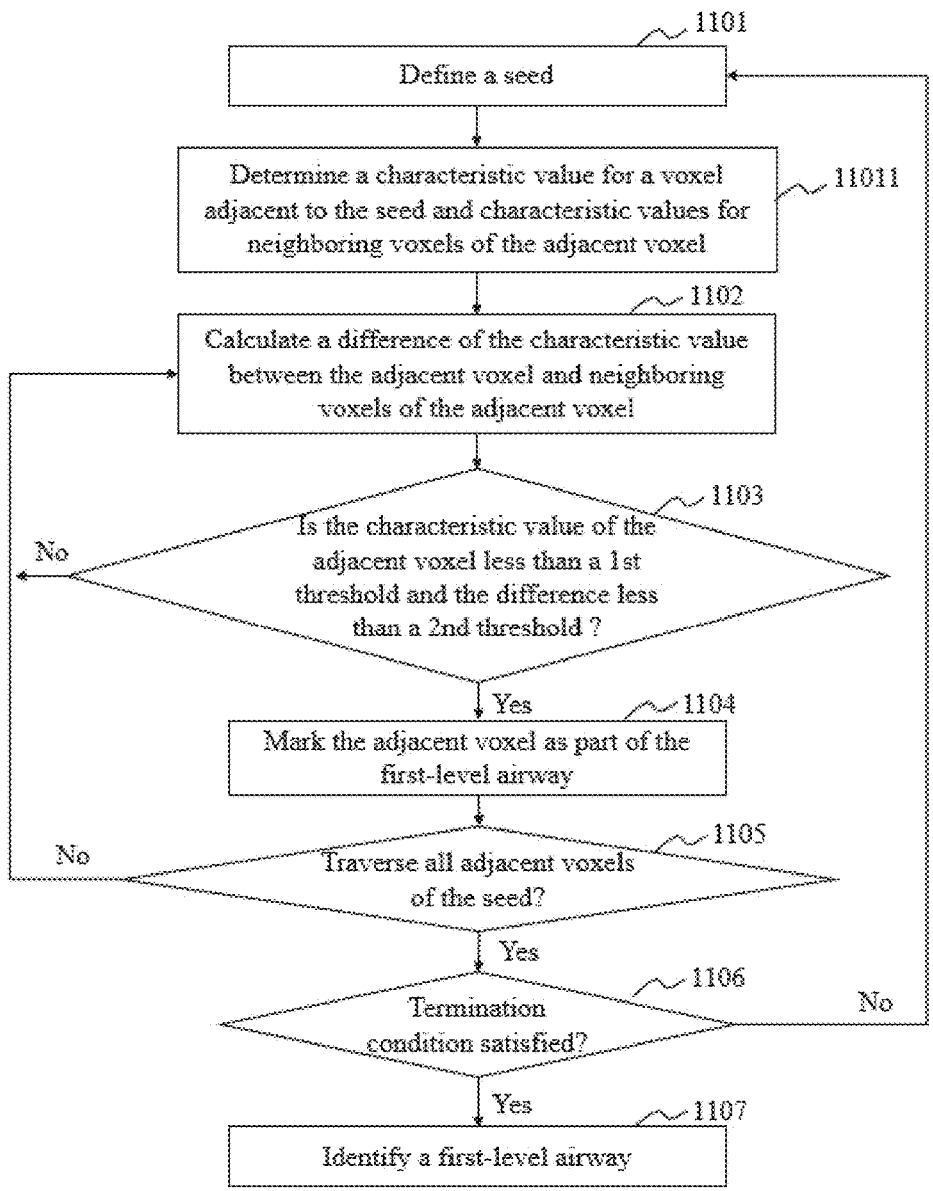
FIG. 11A and FIG. 11B show two flowcharts illustrating exemplary methods for first-level airway extraction according to some embodiments of the present disclosure.
Figure 11B:
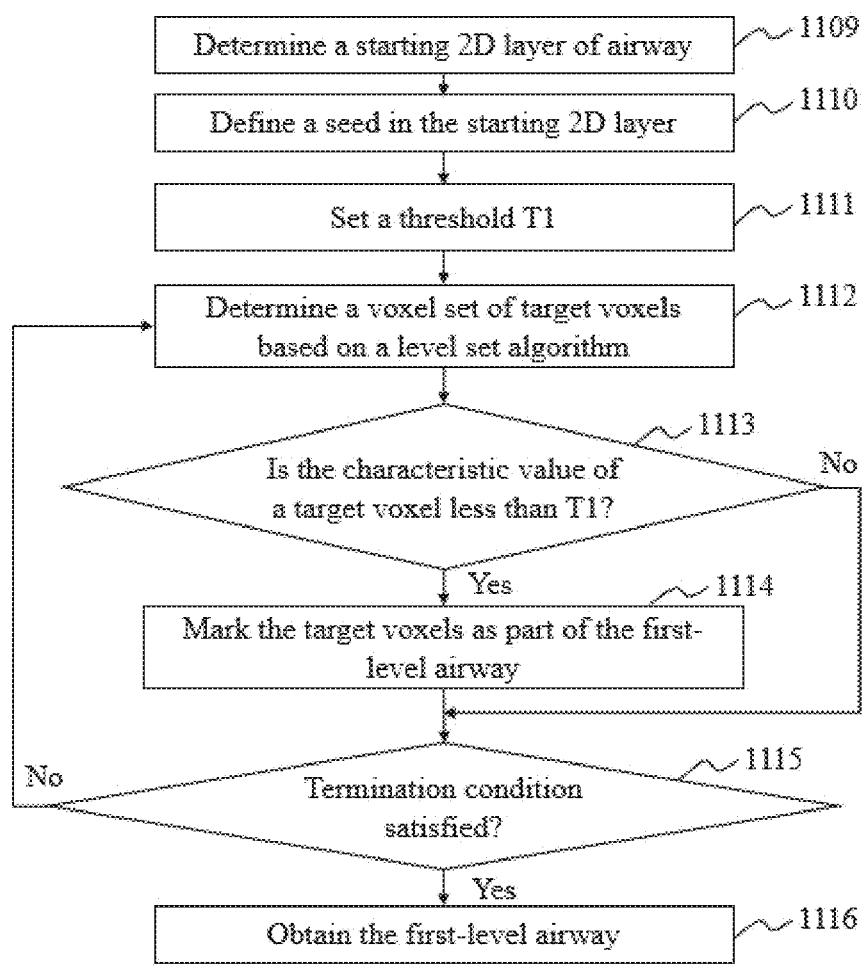
Figure 12A:
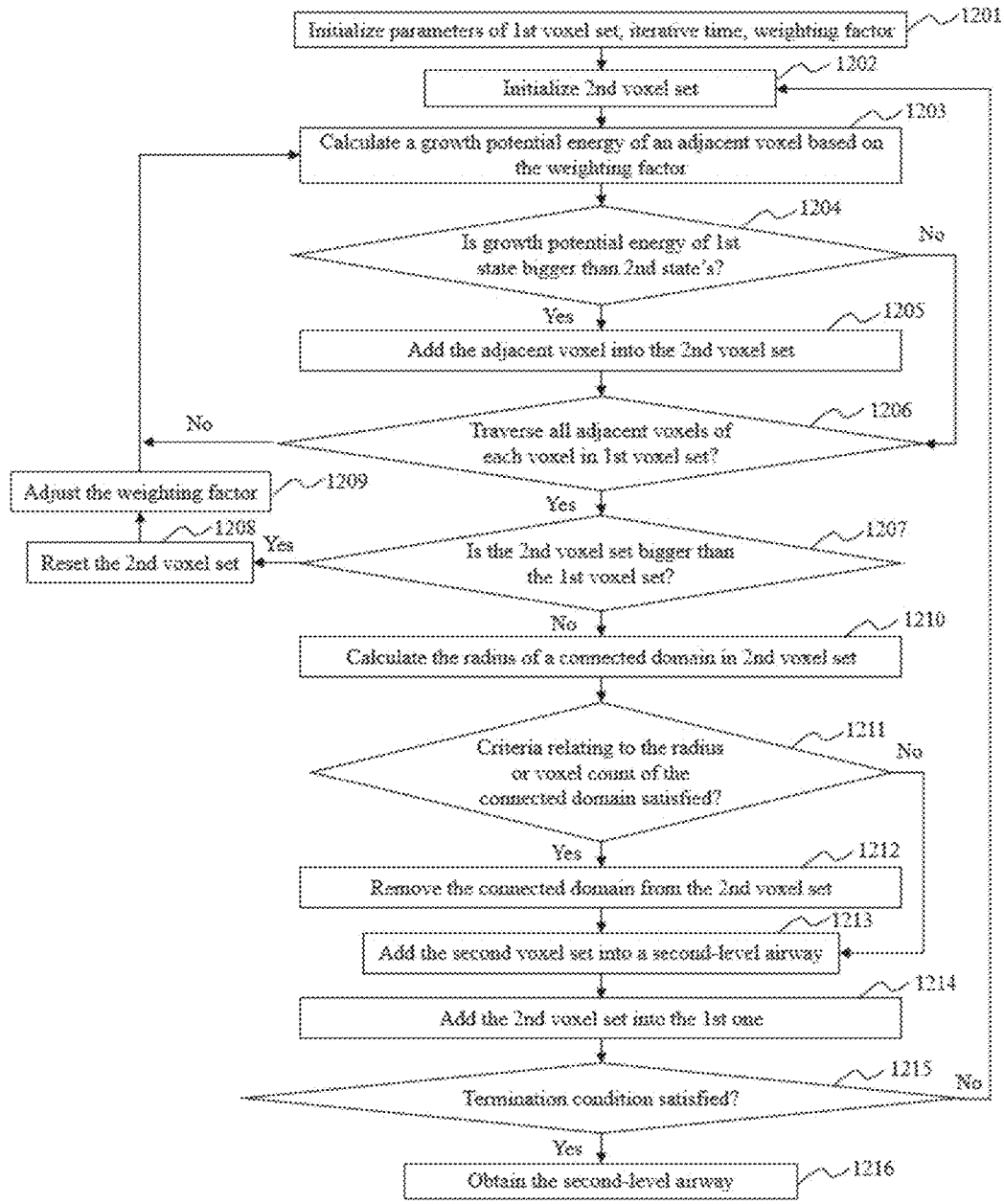
FIG. 12A and FIG. 12B show two flowcharts illustrating exemplary methods for second-level airway extraction according to some embodiments of the present disclosure.
Figure 12B:
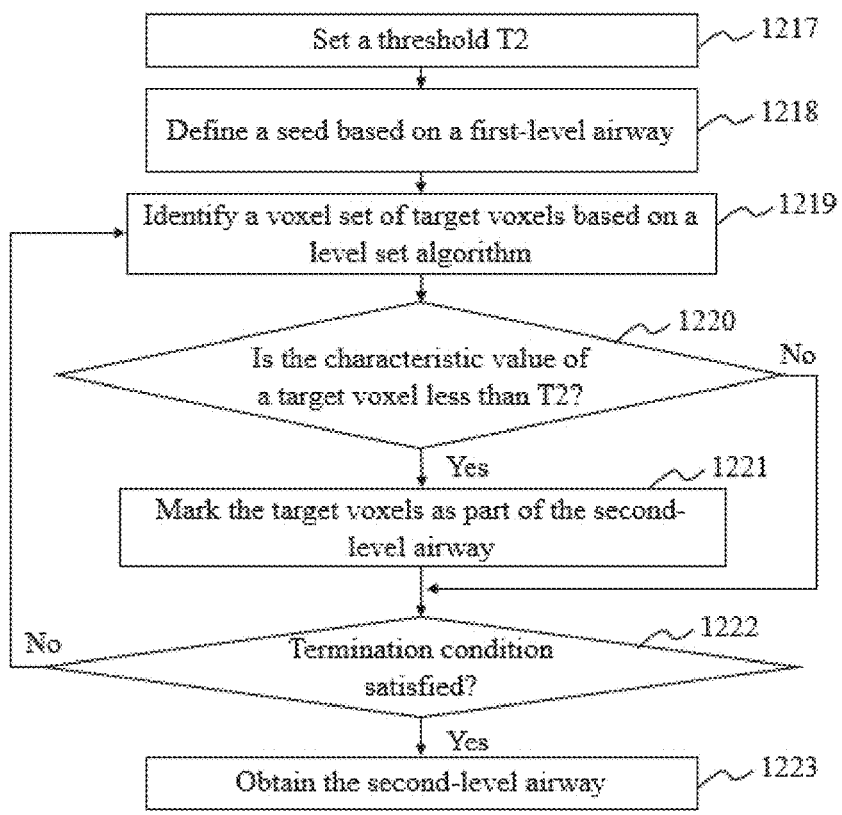

FIG. 11A and FIG. 11B show two flowcharts illustrating exemplary methods for first-level airway extraction according to some embodiments of the present disclosure. In some embodiments, a first-level airway may be extracted based on information relating to a lung organ region. The first-level airway extracting may apply a plurality of methods including, for example, an region growing method, a level set method, a threshold method, or the like, or any combination thereof. In some embodiments, a seed may be set at the beginning of extraction.

FIG. 11A illustrates a first-level airway extracting method based on region growing according to some embodiments of the present disclosure. Region growing is a region-based image segmentation method. According to a region growing method, an adjacent voxel (or pixel) of an initial seed may be examined so that a determination may be made as to whether the adjacent voxel may be added to a target region. In some embodiments, the determination may be based on whether an adjacent voxel meets a standard under a fixed or a variable threshold. A variable threshold may be self-adaptive. For instance, the threshold may be adjusted automatically based on the seed and/or a voxel adjacent to the seed. In some embodiments, the region growing method may be based on a characteristic or a feature including, for example, a gray level, a mean gray level, an intensity, a texture, a color, a contrast, a brightness, or the like, or any combination thereof. An exemplary region growing method based on the gray level is described in detail below. The region growing method for extracting a first-level airway may include searching or defining a seed based on that an airway includes a tube-like structure, and performing region growing.

As illustrated in step 1101, a seed may be defined. The seed may be defined based on the data of a first-level airway region, a lung organ region, and/or a lung region. In some embodiments, the seed may be defined based on the data of an airway with large diameter that located outside the lung tissue region. In some embodiments, the seed may be defined by an automatic method. For instance, a voxel with a characteristic value (e.g., a CT value or a Hounsfield Unit (HU) value for a CT image) or at a specific position (e.g., the center of a specific region) may be determined automatically. In some embodiments, the seed may be defined with a user intervention. For instance, a user may designate a voxel of interest through a graphical user interface (e.g., a display module 140 in FIG. 1). In some embodiments, two or more seeds may be defined.

In step 11011, a characteristic value for a voxel adjacent to the seed (or referred to as an adjacent voxel) may be determined, and characteristic values for neighboring voxels of the adjacent voxel may be determined. In some embodiments, the characteristic value may refer to a CT value or HU value for a CT image. In some embodiments, the characteristic value of a voxel may be determined directly based on the data value corresponding to the voxel. In some embodiments, the characteristic value may be determined based on a data conversion, for example, a conversion from a CT value to a grey level.

In step 1102, a difference in the characteristic value between the adjacent voxel and one or more neighboring voxels of the adjacent voxel may be calculated.

In step 1103, the characteristic value of the adjacent voxel and/or the difference(s) calculated in step 1102 may be compared to one or more thresholds. The adjacent voxel may be determined as belonging to a first-level airway if it meets the one or more thresholds. In some embodiments, the thresholds may include a first threshold and a second threshold. The first threshold may relate to a limit (e.g., an upper limit) of the characteristic value (e.g., a CT value for a CT image) of an airway. For instance, the first threshold may include a MaxAirwayHUThreshold. The first threshold may be applied to judge whether a voxel belongs to an airway. The second threshold may relate to a limit (e.g., an upper limit) of the differences in the characteristic values (e.g., a CT value for a CT image) between a voxel inside an airway and a voxel outside the airway. For instance, the second threshold may include a MaxLunmenWallDiffThreshold. The second threshold may be used to distinguish a voxel in an airway from a voxel in the wall of an airway. If both thresholds are satisfied, for example, the CT value of the adjacent voxel V is lower than the first threshold and the difference in the CT value between an adjacent voxel V and all neighboring voxels of the voxel V is lower than the second threshold, then the voxel V may be determined as belonging to an airway, and the process may proceed to step 1104. Otherwise, the process may return to step 1102, and the next calculation may be based on another adjacent voxel of the seed. In some embodiments, the neighboring voxels may refer to the 26-neighboring voxels. It should be noted that the number 26 is merely for exemplary purposes, the number of the neighboring voxels may be any natural number, e.g., 1, 2, 3, 4, etc.

In step 1104, the adjacent voxel may be marked as part of the first-level airway, indicating that the first-level airway grows. The growing may refer to the addition of a voxel into an airway. As illustrated here, the airway may refer to a voxel set of an airway including the seed. The adjacent voxel satisfying a criterion based on, e.g., one or more thresholds, may be deemed to belong to the airway. Thus, the adjacent voxel may be added into the voxel set of the airway. In some embodiments, the adjacent voxel may be defined as a new seed for further airway growing.

In step 1105, whether all adjacent voxels of the seed are traversed may be judged. If the answer is yes, the process may proceed to step 1106. If the answer is no, the process may return to step 1102, and the next calculation may be based on another adjacent voxel of the seed.

In step 1106, whether a termination condition is satisfied may be judged. The termination condition may be based on a threshold relating to, for example, a growing time, the voxel count of the newly grown airway, or the like, or any combination thereof. If the answer is yes, the process may proceed to step 1107. Otherwise, the process may return to step 1101, and a new seed may be defined. In some embodiments, the new seed may be defined according to an airway that grows in the procedure. For example, the adjacent voxel marked as part of the first-level airway in step 1104 may be defined as the new seed.

In step 1107, a first-level airway may be identified. The voxels satisfying the criteria in the previous steps may be deemed to belong to an airway. The voxels belonging to the airway may be added into a voxel set representing or depicting a first-level airway.

FIG. 11B illustrates a first-level airway extracting method based on level set algorithm and threshold processing according to some embodiments of the present disclosure. The level set method may utilize dynamically variable boundaries for an image segmentation. According to the level set method, the initial surface of a smooth, closed object may be allowed to move along its normal vector field at a speed F. In some embodiments, a portion of the lung organ region may provide an initial region for the level set method. In some embodiments, a seed may be identified as the initial region.

In some embodiments, an active contour of a first-level airway may be embedded into a time-dependent partial differential function $\phi$. The evolution of the active contour of a first-level airway may be approximated implicitly by tracking the zero level set $\Gamma(t)$. The implicit interface $\Gamma$ may include a single or a series of zero isocontours. The evolution of $\phi$ may be determined by the numerical level set equation, which is shown in Equation 1.

$$\begin{cases} \frac{\partial \phi}{\partial t} + E \left| \nabla \phi \right| = 0 \\ \phi(x, t = 0) = \phi_0(x) \end{cases} \quad \text{(Equation 1)}$$

in which $|\nabla \phi|$ denotes the normal direction, $\phi_0(x)$ represents the initial contour, and E represents the balance of multiple forces including the internal force from the inter face geometry (e.g., a mean curvature, a contour length and area) and the external force from an image gradient and/or an artificial momentum.

In some embodiments, a threshold processing may be coordinated with the level set method. In some embodiments, the threshold may be a threshold regarding a value, a gradient value, a connected domain, or the like, or any combination thereof. For example, the threshold may relate to a CT value, an HU value, a gray level, or the like, or a combination thereof. As another example, the threshold may relate to a first order gradient, a second order gradient of, e.g., a CT value, an HU value, a gray level, etc. As still another example, the threshold may relate to one or more parameters of a connected domain including, e.g., the dimension of the connected domain, the voxel count, or the like, or a combination thereof. The dimension of the connected domain may be indicated by, for example, the radius, the diameter, the area, or the like, or a combination thereof. In some embodiments, the connected domain may constitute a newly formed part of the airway. In some embodiments, the threshold may relate to the dimension (e.g., radius, diameter, area, etc.) of at least a portion of the airway, e.g., the newly formed portion corresponding to the connected domain. In some embodiments, the threshold may be used in combination with Equation 1 to control or limit the evolution of the active contour of a first-level airway described by, e.g., the time-dependent partial differential function $\phi$. In some embodiments, the threshold may be used to judge whether a target voxel belongs to a first-level airway.

As illustrated in step 1109, a starting 2D layer of airway may be determined. In some embodiments, the determination step 1109 may be performed automatically. As the lung organ region may include a plurality of voxels in three dimensional space, the voxels may be extracted layer by layer (i.e., 2D layer). For a lung organ region having n 2D layers, a starting 2D layer may be determined from the n layers. The area of the airway tube in a 2D layer may be calculated. If the area of a 2D layer is larger than a threshold (e.g., 2 square millimeters), the 2D layer may be determined as the starting layer of airway. Otherwise, the area of other 2D layers may be calculated and compared with the threshold, until a 2D layer whose area is larger than the threshold may be determined. In some embodiments, the determination step 1109 may be performed semi-automatically or manually. For example, a user may determine the starting layer through a graphical user interface in the input/output device 140.

In step 1110, a seed may be defined in the starting 2D layer determined in step 1109. In some embodiments, two or more seeds may be set. In some embodiments, the seed may be defined based on a first-level airway which may be determined previously. In some embodiments, step 1110 may be performed automatically. The seed may be defined as a voxel (or pixel) inside an airway tube. For example, the center of the airway tube in the starting 2D layer may be defined as the seed. In some embodiments, step 1110 may be performed semi-automatically or manually. For example, a user may define a seed in the starting 2D layer through a graphical user interface in the input/output device 140.

In step 1111, a threshold T1 may be set. In some embodiments, the threshold may be a threshold relating to a CT value or a gray level. In some embodiments, the threshold may be used to control or limit the evolution of the active contour of a first-level airway described by, e.g., the time-dependent partial differential function $\phi$. In some embodiments, the threshold may be used to judge whether a target voxel belongs to a first-level airway.

In step 1112, a voxel set including target voxels may be determined based on a level set algorithm. The target voxels may be determined based on the evolution of the active contour of a first-level airway described by, e.g., the time-dependent partial differential function $\phi$. In some embodiments, one or more new seeds may be defined in step 1112. The new seeds may be defined based on one or more target voxels marked as part of the first-level airway in step 1114. For instance, one or more target voxels marked in step 1114 may be used as new seeds in further steps of the process.

In step 1113, a characteristic value of a target voxel may be compared with threshold T1. In some embodiments, the characteristic value may relate to a value, a gradient, a connected domain, or the like, or any combination thereof. For example, the characteristic value may be a CT value, an HU value, an energy function value, and/or a gray level. As another example, the characteristic value may relate to a first order gradient or a second order gradient of, e.g., a CT value, an HU value, a gray level, etc. As still another example, the characteristic value may relate to one or more parameters of a connected domain, e.g., the dimension (e.g., radius, diameter, area, etc.) of the connected domain, the voxel count, or the like, or a combination thereof. In some embodiments, the connected domain may constitute a newly formed part of the airway. In some embodiments, the threshold may relate to the dimension (e.g., radius, diameter, area, etc.) of at least a portion of the airway, e.g., the newly formed portion corresponding to the connected domain. The comparison process may be used for identifying whether the target voxel belongs to an airway. If the characteristic value of a target voxel is lower than T1, the process may proceed to step 1114. Otherwise, the process may proceed to step 1115.

In step 1114, the target voxels may be marked as part of the first-level airway. As used herein, the first-level airway may refer to a voxel set including the seed(s). The target voxels may be added into the voxel set. In some embodiments, one or more target voxels may be defined as new seeds for further extraction of the first-level airway.

In step 1115, whether a termination condition is satisfied may be judged. The termination condition may relate to the target voxels. For example, whether the voxel count of the target voxels satisfies a threshold. In some embodiments, the termination condition may relate to a parameter in the processing. For example, a processing time for an algorithm, cycle times, or iteration times, or the like, or a combination thereof. In some embodiments, the termination condition may relate to a user intervention. For example, the target voxels may be presented to a user through the input/output device 140, and the user may determine whether to end the process or not. If the termination condition is satisfied, the process may proceed to step 1116. Otherwise, the process may return to step 1112, and new target voxels may be determined. The new target voxels may be determined based on one or more new seeds. In some embodiments, the new seeds may be defined in step 1112 or step 1114. The new seeds may be defined based on one or more target voxels marked as part the first-level airway in step 1114. In some embodiments, the process may end automatically. For example, when the evolution of the active contour of a first-level airway described by, e.g., the time-dependent partial differential function $\phi$ is completed in step 1112, the process may automatically terminate after steps 1113 and 1114.

In step 1116, a first-level airway may be obtained.

It should be noted that the above description of the flowcharts in FIG. 11A and FIG. 11B is merely provided for the purposes of illustration, and not intended to limit the scope of the present disclosure. For persons having ordinary skills in the art, multiple variations or modifications may be made under the teachings of the present disclosure. For example, step 1113 may be integrated into step 1112, or step 1113 may be executed during the evolution of the active contour of a first-level airway described by, e.g., the time-dependent partial differential function φ in step 1112. As another example, the threshold T1 may be set as an additional factor in the evolution of the active contour of a first-level airway. The evolution of the active contour of a first-level airway may be described by a function or an equation other than Equation 1. As a further example, when a termination condition is not satisfied in step 1115, the process may return to step 1110 or 1109, and a new seed may be defined for further airway extraction. As still a further example, the threshold value used in steps 1103, 1106, 1113, or 1115 may be adjusted self-adaptively.

FIG. 12A and FIG. 12B show two flowcharts illustrating exemplary methods for second-level airway extraction according to some embodiments of the present disclosure. A second-level airway may be extracted based on a first-level airway. The second-level airway extracting may apply a plurality of methods including, for example, an energy-based 3D reconstruction method, a level set method, a threshold method, or the like, or any combination thereof. In some embodiments, a seed may be defined at the beginning of extraction.

FIG. 12A illustrates a method for extracting a second-level airway based on an energy-based 3D reconstruction process according to some embodiments of the present disclosure. The energy-based 3D reconstruction is a growing method based on a constraint condition of local energy minimization. For instance, according to the Markov Random Field theory, the energy function may relate to a growing potential energy. For a voxel, the growing potential energy of two states may be calculated. The two states may include a first state that the voxel belongs to a second-level airway and a second state that the voxel does not belong to a second-level airway. Whether a voxel belongs to a second-level airway may be determined by comparing the growing potential energy of the voxel at different states. For example, if the growing potential energy in the first state is bigger than that of the second state, the voxel may be determined as belonging to a second-level airway, and vice versa.

According to the Markov Random Field theory, the energy function e may relate to the growing potential energy $V_{prop}$, which may be calculated according to:

$$\varepsilon = \exp\left(\frac{V_{prop}}{kT}\right), \quad \text{(Equation 2)}$$

in which kT may be a fixed value. In some embodiments, kT may refer to a constant temperature term.

The growing potential energy $V_{prop}$ in different states $st_x$ may be calculated for a voxel x. For example, if the voxel belongs to a second-level airway, the $st_x$ may be assigned by 1 (the first state). If the voxel does not belong to a second-level airway, the $st_x$ may be assigned by 0 (the second state). In some embodiments, if $V_{prop}$ in different states satisfy a mathematical relationship $V_{prop}(x,1)-V_{prop}(x,0)>0$, the voxel x may be determined as belonging to a second-level airway. Given the topology and density information of the second-level airway, the $V_{prop}$ may include a first term $V_{radial}$, a second term $V_{distal}$, and a third term $V_{control}$. In some embodiments, the $V_{radial}$ may be used to support a growth in a radial direction, the $V_{distal}$ may be used to support a growth in a distal direction and the $V_{control}$ may be used to limit the growth in an airway tube. In some embodiments, one or more of the three terms may be weighted. In some embodiments, $V_{prop}$ and the three terms may have a mathematical relationship including addition, subtraction, multiplication, division, a function, or the like, or any combination thereof. For example, $V_{prop}$ may be calculated by the sum of the three terms, i.e., $V_{prop}=V_{radial}+V_{distal}+V_{control}$. As another example, $V_{prop}$ may be calculated by a weighted sum of the three terms, i.e., $V_{prop}=w_1 \cdot V_{radial}+w_2 \cdot V_{distal}+w_3 \cdot V_{control}$. In some embodiments, the three terms $V_{radial}$, $V_{distal}$, and $V_{control}$ may be calculated by the following equations:

$$V_{radial}(x, st_x) = \frac{\Sigma_{y \in v_{26}(x) / st_y = st_x}(F(x) - F(y))}{\Sigma_{y \in v_{26}(x)} 1_{\{st_y = st_x\}}} + \Sigma_{y \in v_{26}(x)} 1_{\{st_y = st_x\}}, \quad \text{(Equation 3)}$$

$$V_{distal}(x, st_x) = k_{x,v} \cdot \left(1 + \Sigma_{y \in v_{n,v}(x)} 1_{\{st_y = st_x\}}\right) \cdot \left(1 + \Sigma_{y \in v_{f,v}(x)} 1_{\{st_y \neq st_x\}}\right), \quad \text{(Equation 4)}$$

and $$V_{control}(x, st_x) = -\sqrt{\frac{\Sigma_{y \in v_{26}(x) / st_y = 1}(F(x) - F(y))^2}{\Sigma_{y \in v_{26}(x)} 1_{\{st_y = 1\}}}} + F(x)_{\{st_x = 0\}}, \quad \text{(Equation 5)}$$

in which x and y are voxel variables, v may be a voxel set, $v_{26}(x)$ may represent the 26-neighboring voxels of the voxel x, $v_{n,v}(x)$ may be a set of voxel adjacent to the voxel x, $v_{f,v}(x)$ may be a set of voxel apart from the voxel x, and $st_x$ may represent a state of the voxel x. k may be a normalizing factor that guarantee the isotropy of growth in a second-level airway. F may refer to an HU value of the voxel x. In some embodiments, the number of the neighboring voxels may be set as a value different from 26. For example, a 6-neighboring voxels may be applied in Equation 3 and/or Equation 5, which means $v_6(x)$ may be used instead of $v_{26}(x)$.

As illustrated in step 1201, some parameters may be initialized. The parameters may include a first voxel set, iteration times, one or more weighting factors assigned to the terms (e.g., $V_{radial}$, $V_{distal}$, and $V_{control}$), or the like, or any combination thereof. For example, the first voxel set may be initialized as $S_1=I_s$, the iteration times may be initialized as N=0, and the weighting factors of the terms (e.g., $V_{radial}$, $V_{distal}$, and $V_{control}$) may be assigned by $w_1$, $w_2$, and $w_3$, respectively. The weighting factors $w_1$, $w_2$, and $w_3$ may be set as the same or not. In some embodiments, the first voxel set may be initialized based on a first-level airway. For example, the first voxel set may include one or more voxels of the first-level airway. As another example, the first voxel set may include the voxels on the boundary of the first-level airway. In some embodiments, the initialization step 1201 may be performed automatically. In some embodiments, the initialization step 1201 may be performed semi-automatically or manually. For example, the first voxel set may be initialized based on a manual selection of voxels in the first-level airway. As another example, the iteration times and/or the weighting factors may be acquired from an input provided by a user through, for example, an input interface of the system (e.g., the display device 140 in FIG. 1). In some embodiments, one or more threshold that may be applied in the following process (e.g., step 1211, and/or step 1215) may be set in the initialization step 1201.

In step 1202, a second voxel set $S_2$ may be initialized as $S_2$=NULL, wherein NULL is a null set.

In step 1203, the growing potential energy of each voxel p adjacent to each voxel in the first voxel set $S_1$ may be calculated. The growing potential energy may be calculated as $V_{prop}=w_1 \cdot V_{radial}+w_2 * V_{distal}+w_3 * V_{control}$. The growing potential energies in the first state (i.e., $st_p=1$) and the second state (i.e., $st_p=0$) for each voxel p may be calculated separately.

In step 1204, the growing potential energy of voxel p in the first state (i.e., $V_{prop}(p,1)$) and the second state ($V_{prop}(p,0)$) may be compared. As used herein, $V_{prop}(p,1)$ may refer to the growing potential energy in the first state ($st_p=1$) that the voxel p belongs to a second-level airway, and $V_{prop}(p,0)$ may refer to the growing potential energy in the second state ($st_p=0$) that the voxel p does not belong to a second-level airway. If $V_{prop}(p,1)>V_{prop}(p,0)$, the process may proceed to step 1205; otherwise, it may proceed into step 1206.

In step 1205, the voxel p may be added into the second voxel set $S_2$.

In step 1206, whether all adjacent voxels of each voxel in the first voxel set $S_1$ are traversed or not may be judged. One or more judgements may be performed in step 1206. In some embodiments, a first judgement may relate to whether all adjacent voxels p of a voxel in the first voxel set $S_1$ are traversed. In some embodiments, a second judgement may relate to whether all voxels in the first voxel set $S_1$ are traversed. If the answer is yes, the process may proceed to step 1207. If the answer is no, the process may return to step 1203, and the growing potential energy of a new adjacent voxel p' may be calculated.

In step 1207, the number of the voxels in the first voxel set $S_1$ and in the second voxel set $S_2$ may be compared. If the number of the voxels in $S_1$ is bigger than the number of the voxels in $S_2$, which means the growing second-level airway may be bigger than the original airway (e.g., the airway where the seed locates), the process may proceed to step 1208. Otherwise it may proceed to step 1210.

In step 1208, the second voxel set $S_2$ may be reset. In some embodiments, $S_2$ may be cleaned. That is, the growing second-level airway bigger than the original airway may be determined as incorrect and may be abandoned. In some embodiments, one or more voxels of $S_2$ may be removed or changed. After resetting, the process may proceed to step 1209.

In step 1209, one or more weighting factors (e.g., $w_1$, $w_2$, and $w_3$) may be adjusted. In some embodiments, an adjustment factor $\Delta w$ may be added to one or more weighs. In steps 1206 and 1208, if it is determined that the growing second-level airway is bigger than the original airway, indicating that the limited growth in an airway tube is not controlled properly, the weighting factor of the term $V_{control}$ may be increased to impose a stronger constraint on further growth. For example, the weighting factor $w_3$ for the term $V_{control}$ may be redefined as $w_3+=\Delta w$. Afterwards, the process may return to step 1203, and the growing potential energy of a new adjacent voxel p' may be calculated.

In step 1210, one or more connected domains D in the second voxel set $S_2$ may be determined. The determination of D may be realized through a method including, for example, a contour tracing method, a contour filling method, a flood fill approach, or the like, or any combination thereof. Then a radius r of a connected domain d may be calculated.

In step 1211, a judgment may be made based on a criterion. The criterion may relate to the radius r and/or the voxel count of the connected domain d. In some embodiments, the voxel count $n_d$ and/or the radius r of the connected domain d may be compared with a threshold, respectively. As used herein, the voxel count $n_d$ may refer to the number of voxels in a connected domain d. In some embodiments, different thresholds may be applied for $n_d$ and/or r. For example, $n_T$ may represent a threshold of the voxel count $n_d$, and $r_T$ may represent a threshold of the radius r. In some embodiments, if the voxel count $n_d$ is bigger than $n_T$, and/or the radius r is bigger than $r_T$, the process may proceed to step 1212; otherwise, the process may proceed to step 1213.

In step 1212, connected domain d whose voxel count $n_d$ is bigger than $n_T$, or radius r is bigger than $r_T$ may be deemed to be a "leakage." The leakage may refer to a growth outside an airway. In some embodiments, the voxels in the connected domain d may be removed from the second voxel set $S_2$. In some embodiments, one or more voxels in the connected domain d may be removed from the second voxel set $S_2$, so that the voxel count $n_d$ of the connected domain d is no larger than $n_T$, and/or the radius r of the connected domain d is no larger than $r_T$. By doing this, leakage may be prevented in the energy-based 3D reconstruction.

In step 1213, the remaining voxels in the second voxel set $S_2$ may be added into a second-level airway set $I_f$.

In step 1214, the second voxel set $S_2$ may be assigned to the first voxel set $S_1$ and the number of iteration may be added with 1, i.e., $S_1=S_2$ and N+=1. By doing this, the next iteration reconstruction may be initialized.

In step 1215, a judgment may be made as to whether a termination condition is satisfied. The termination condition may relate to the first set $S_1$ and/or the iteration times N. In some embodiments, whether the first set $S_1$ is nonempty and the iteration times smaller than a threshold may be judged. That the first set $S_1$ is nonempty may indicate that a second-level airway may have successfully grown. That the iteration times are smaller than a threshold may indicate that the iteration may not end. If the two conditions are satisfied, which means the next iteration may be continued, the process may return to step 1202, and a new iteration may be started. Otherwise, the process may be ended, and the process may proceed to step 1216.

In step 1216, a second-level airway segmentation result $I_f$ may be obtained after the entire iteration process.

It should be noted that the above description of the diagram in FIG. 12A is merely provided for the purposes of illustration, and not intended to limit the scope of the present disclosure. For persons having ordinary skills in the art, multiple variations or modifications may be made under the teachings of the present disclosure. For example, a weighting factor $w_1$ and/or $w_2$ may also be adjusted in step 1209. In some embodiments, one or more steps in FIG. 12A may be exchanged, added or removed. For example, the steps extracting an airway tree may be added before an energy-based 3D reconstruction process, and/or an image fusion process may be added after the energy-based 3D reconstruction process. As another example, the adjustment process step 1209 may be unnecessary. In some embodiments, the parameters in some step may be changed or replaced. For example, thresholds such as $n_T$, $r_T$, and parameters such as $w_1$, $w_2$, or $w_3$ may be varied or changed according to specific implementation scenarios. However, those variations, changes and modifications do not depart from the scope of the present disclosure.

FIG. 12B illustrates a second-level airway extracting method based on level set algorithm and threshold processing according to some embodiments of the present disclosure. In some embodiments, a threshold processing may be coordinated with the level set method. In some embodiments, the threshold may be a threshold regarding a CT value or a gray level. In some embodiments, the threshold may be used in combination with Equation 1 to control or limit the evolution of the active contour of a second-level airway described by, e.g., the time-dependent partial differential function $\phi'$. In some embodiments, the threshold may be used to judge whether a target voxel belongs to a second-level airway.

As illustrated in step 1217, a threshold T2 may be set. In some embodiments, the threshold may be a threshold regarding a value, a gradient, a connected domain, or the like, or any combination thereof. For example, the threshold may relate to a CT value, an HU value, and/or a gray level. As another example, the threshold may relate to a first order gradient or a second order gradient of, e.g., a CT value, an HU value, a gray level, etc. As still another example, the threshold may relate to one or more parameters of a connected domain, e.g., the dimension (e.g., the radius, diameter, area, etc.) of the connected domain, the voxel count, or the like, or a combination thereof. In some embodiments, the connected domain may constitute a newly formed part of the airway. In some embodiments, the threshold may relate to the dimension (e.g., radius, diameter, area, etc.) of at least a portion of the airway, e.g., the newly formed portion corresponding to the connected domain. In some embodiments, the threshold may be used in combination with Equation 1 to control or limit the evolution of the active contour of a second-level airway described by, e.g., the time-dependent partial differential function $\phi'$. In some embodiments, the threshold may be used to judge whether a target voxel belongs to a second-level airway. In some embodiments, the threshold T2 may be different from T1. For example, T2 may be larger than T1.

In step 1218, a seed may be defined based on a first-level airway. In some embodiments, two or more seeds may be defined. In some embodiments, the seed may be defined based on a second-level airway which may be determined previously. In some embodiments, step 1218 may be performed automatically. The seed may be defined as a voxel (or pixel) inside an airway tube. For example, the center of an airway tube may be defined as the seed. In some embodiments, step 1218 may be performed semi-automatically or manually. For example, a user may define a seed through a graphical user interface in the input/output device 140.

In step 1219, a voxel set including target voxels may be identified based on a level set algorithm. The target voxels may be determined based on the evolution of the active contour of a second-level airway described by, e.g., the time-dependent partial differential function $\phi'$. In some embodiments, one or more new seeds may be defined in step 1219. The new seeds may be defined based on one or more target voxels marked as part of the second-level airway in step 1221. For instance, one or more target voxels marked in step 1221 may be used as new seeds in further steps of the process.

In step 1220, a characteristic value of a target voxel may be compared with threshold T2. In some embodiments, the characteristic value may relate to a value, a gradient value, a connected domain, or the like, or any combination thereof. For example, the characteristic value may be a CT value, an HU value, an energy function value, and/or a gray level. As another example, the characteristic value may relate to a first order gradient or a second order gradient of, e.g., a CT value, an HU value, a gray level, etc. As still another example, the characteristic value may relate to one or more parameters of a connected domain, e.g., the dimension (e.g., the radius, diameter, area, etc.) of the connected domain, the voxel count, or the like, or a combination thereof. In some embodiments, the connected domain may constitute a newly formed part of the airway. In some embodiments, the threshold may relate to the dimension (e.g., radius, diameter, area, etc.) of at least a portion of the airway, e.g., the newly formed portion corresponding to the connected domain. In some embodiments, the type of the characteristic value used in step 1220 may be the same as that used in step 1113. For example, the characteristic value used in step 1220 may be an HU value, and the characteristic value used in step 1113 may be an HU value. In some embodiments, the value number used in step 1220 and step 1113 may be different. In some embodiments, the type of the characteristic value used in step 1220 may be different from that used in step 1113. For example, the characteristic value used in step 1220 may be an energy function value, while the characteristic value used in step 1113 may be an HU value. The comparison process may be used for identifying whether the target voxel belongs to an airway. If the characteristic value of a target voxel is lower than T2, the process may proceed to step 1221. Otherwise, the process may proceed to step 1222.

In step 1221, the target voxels may be marked as part of the second-level airway. As used herein, the second-level airway may refer to a voxel set including the seed(s). The target voxels may be added into the voxel set. In some embodiments, one or more target voxels may be defined as new seeds for further extraction of the second-level airway.

In step 1222, whether a termination condition is satisfied or not may be judged. The termination condition may relate to the target voxels. For example, whether the voxel count of the target voxels satisfies a threshold. In some embodiments, the termination condition may relate to a parameter in the processing. For example, a processing time for an algorithm, cycle times, or iteration times, or the like, or a combination thereof. In some embodiments, the termination condition may relate to a user intervention. For example, the target voxels may be presented to a user through the input/output device 140, and the user may determine whether to end the process or not. If the termination condition is satisfied, the process may proceed to step 1223. Otherwise, the process may return to step 1219, and new target voxels may be determined. The new target voxels may be determined based on one or more new seeds. In some embodiments, the new seeds may be defined in step 1219 or step 1221. The new seeds may be defined based on one or more target voxels marked as part of the second-level airway in step 1221. For instance, one or more target voxels marked in step 1221 may be used as new seeds in further steps of the process. In some embodiments, the process may end automatically. For example, when the evolution of the active contour of a second-level airway described by, e.g., the time-dependent partial differential function $\phi'$ is completed in step 1219, the process may automatically terminate after steps 1220 and 1221.

In step 1223, a second-level airway may be obtained.

It should be noted that the above description of the flowcharts in FIG. 12A and FIG. 12B is merely provided for the purposes of illustration, and not intended to limit the scope of the present disclosure. For persons having ordinary skills in the art, multiple variations or modifications may be made under the teachings of the present disclosure. For example, step 1220 may be integrated into step 1219, or step 1220 may be executed during the evolution of the active contour of a second-level airway described by, e.g., the time-dependent partial differential function ϕ' in step 1219. As another example, the threshold T2 may be set as an additional factor in the evolution of the active contour of a second-level airway described by, e.g., the time-dependent partial differential function ϕ'. The evolution of the active contour of a second-level airway may be described by a function or an equation other than Equation 1. As a further example, when a termination condition is not satisfied in step 1222, the process may return to step 1218, and a new seed may be defined for further airway extraction. As still a further example, the threshold value used in steps 1211, 1215, 1220, or 1222 may be adjusted self-adaptively.

EXAMPLES

The following examples are provided for illustration purposes, and are not intended to limit the scope of the present disclosure.

Figure 13A:
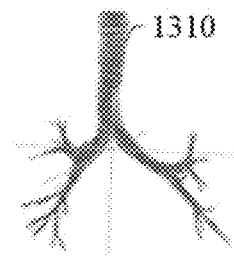
FIG. 13A through FIG. 13D are four exemplary images produced based on a region growing method and an energy-based 3D reconstruction segmentation according to some embodiments of the present disclosure.
Figure 13B:
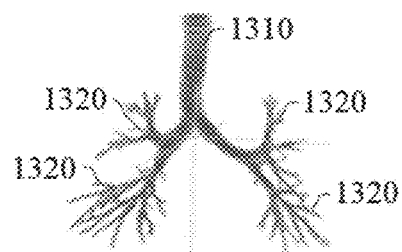

FIG. 13A through FIG. 13D are four exemplary images produced based on a region growing method and an energy-based 3D reconstruction segmentation according to some embodiments of the present disclosure. FIG. 13A shows the result of a first-level airway 1310. The identification may be achieved according to step 902. The first-level airway 1310 was identified by the first-level airway segmentation unit 820. Specifically, the first-level airway 1310 was identified using a region growing method, as illustrated in FIG. 11A. Twenty-six neighboring voxels were used for calculation according to step 1102. The first-level airway 1310 includes 1-4 levels bronchi. As shown in FIG. 13A, the airway at the center of the image is a main trachea. The main trachea has a plurality of bronchi with multiple levels. The radius of the highest level bronchus in FIG. 13A is smaller than that of the main trachea. FIG. 13B shows the fusion result of a first-level airway 1310 and a second-level airway 1320. The second-level airway 1320 was identified. The identification may be achieved according to step 903 and may be performed by the second-level airway segmentation unit 830. Specifically, the second-level airway 1320 was identified by using an energy-based 3D reconstruction method, as illustrated in FIG. 12A. Twenty-six neighboring voxels were used for calculation of growth potential energy according to step 1203. The first-level airway 1310 and the second-level airway 1320 were fused according to step 904 by the fusion unit 840. As shown in FIG. 13B, the second-level airway 1320 extends from the terminal of the first-level airway 1310. The first-level airway 1310 and the second-level airway 1320 were fused to form an airway tree. Besides, the radius of the highest level bronchus in the fire-level airway 1310 is wider than that of the lowest level bronchus in the second-level airway 1320.

Figure 13C:
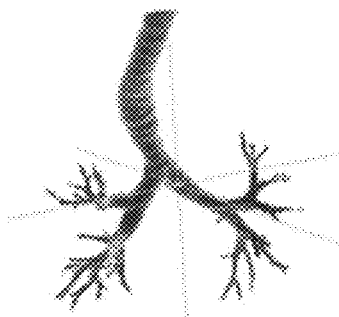
Figure 13D:
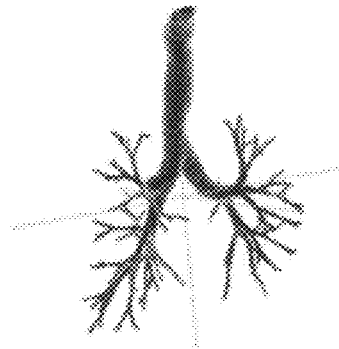

FIG. 13C shows another exemplary image of the result of a first-level airway. The identification may be achieved according to step 902. The first-level airway was identified by the first-level airway segmentation unit 820. Similar to the image in FIG. 13A, the first-level airway was identified by using a region growing method, while some parameters used were different, for example, the number of neighboring voxels, the iteration times, etc. FIG. 13D shows another exemplary image of the fusion result of a first-level airway and a second-level airway. A second-level airway was identified. The identification may be achieved according to step 903 and may be performed by the second-level airway segmentation unit 830. Similar to the image in FIG. 13B, the second-level airway was identified by using an energy-based 3D reconstruction method, while some parameters used were different, for example, the number of neighboring voxels, the iteration times, etc. The radius of the highest level bronchus in FIG. 13C is smaller than that of the main trachea, and the radius of the highest level bronchus in the fire-level airway in FIG. 13D is wider than that of the lowest level bronchus in the second-level airway in FIG. 13D. It may be indicated that the combination of the region growing method (used for the first-level airway identification) and the energy-based 3D reconstruction method (used for the second-level airway identification) is effective in preventing a "leakage."

Figure 14A:
FIG. 14A through FIG. 14C are three exemplary images produced based on a level set algorithm according to some embodiments of the present disclosure.
Figure 14B:
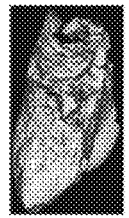
Figure 14C:
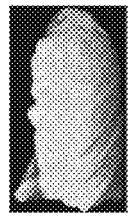

FIG. 14A through FIG. 14C are three exemplary images produced based on a level set algorithm according to some embodiments of the present disclosure. FIG. 14A shows the fusion result of a first-level airway and a second-level airway. The first-level airway was identified according to step 902. The identification may be performed by the first-level airway segmentation unit 820. Specifically, the first-level airway was identified by using a level set method, as illustrated in FIG. 11B. A starting 2D layer of airway was determined, and the center of the airway in the starting 2D layer was defined as the seed. A threshold T1 within the range of (−600, −400) was set. The second-level airway was identified according to step 903. The identification may be performed by the second-level airway segmentation unit 830. Specifically, the second-level airway was identified by using a level set method, as illustrated in FIG. 12B. A seed was defined based on the first-level airway. A threshold T2 within the range of (−1000, −670) was set. The first-level airway and the second-level airway were fused according to step 904 by the fusion unit 840. It may be indicated that the level set algorithm is effective in preventing a "leakage".

FIG. 14B shows the result of a left lung tissue extraction. FIG. 14C shows the result of a right lung tissue extraction. The left/right lung tissue extraction was performed by the lung tissue region segmentation unit 540. The left/right lung tissue was extracted according to the procedure illustrated in FIG. 6, FIG. 7A and FIG. 7B. The right lung tissue in FIG. 14C is obviously different from a normal lung tissue. In may be indicated that the lung tissue extraction has great potential to facilitate clinical diagnosis of lung disease.

It should be noted that the above description is merely provided for the purposes of illustration, and not intended to limit the scope of the present disclosure. For persons having ordinary skills in the art, multiple variations and modifications may be made under the teachings of the present disclosure. For example, the lung region segmentation, lung organ region segmentation, airway region segmentation, and/or lung tissue region segmentation disclosed in this disclosure may combine with techniques including a repair process, a render process, a filling process, or the like, or any combination thereof, or the like, or any combination thereof. As another example, some steps such as the pre-processing may be deleted. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A method of image processing implemented on at least one machine, each of which has at least one processor and storage device, the method comprising:
    acquiring a three-dimensional image data set representative of a region including at least one airway, the data set comprising a plurality of voxels;
    identifying a first-level seed within the region;
    identifying a first-level airway within the region based on the first-level seed;
    defining a plurality of second-level seeds based on the first-level airway;
    identifying a second-level airway within the region by performing growing based on the plurality of second-level seeds using an energy-based 3D reconstruction algorithm; and
    fusing the first-level airway and the second-level airway to form an airway tree.

2. The method of claim 1, the identifying a first-level airway comprising:
    selecting, from the plurality of voxels, an adjacent voxel of the first-level seed and neighboring voxels of the adjacent voxel;
    determining a characteristic value for the adjacent voxel and a characteristic value for each of the neighboring voxels;
    calculating a difference between the characteristic value for the adjacent voxel and the characteristic value for each of the neighboring voxels; and
    marking, when the characteristic value of the adjacent voxel is below a first threshold and when, for each of the neighboring voxels, the difference is below a second threshold, the adjacent voxel as part of the first-level airway.

3. The method of claim 1, the identifying a first-level airway comprising:
    determining a voxel set based on a level set method;
    selecting a voxel from the voxel set;
    determining a first characteristic value of the voxel, wherein the first characteristic value includes a grey level; and marking, when the first characteristic value of the voxel is below a third threshold, the voxel as part of the first-level airway.

4. The method of claim 1, the performing growing comprising:
selecting a plurality of adjacent voxels for each of the plurality of second-level seeds;
initializing a voxel set;
for each adjacent voxel,
calculating a first growing potential energy of the adjacent voxel at a first state;
calculating a second growing potential energy of the adjacent voxel at a second state;
determining, based on the first growing potential energy and the second growing potential energy, whether to add the adjacent voxel into the voxel set;
determining whether the voxel set belongs to the second-level airway; and
adding, when the voxel set is determined to belong to the second-level airway, the voxel set into the second-level airway.

5. The method of claim 4, the performing growing further comprising:
defining, when the voxel set is determined to belong to the second-level airway, a new seed among the voxel set.

6. The method of claim 4, the determining whether the voxel set belongs to the second-level airway comprising:
identifying a connected domain within the voxel set;
determining a dimension of the connected domain;
determining a voxel count of the connected domain;
performing a first comparison between the dimension of the connected domain and a fifth threshold;
performing a second comparison between the voxel count of the connected domain and a sixth threshold; and
determining, based on the first comparison or the second comparison, whether the connected domain belongs to the second-level airway.

7. The method of claim 6 further comprising:
removing, when the connected domain is determined not to belong to the second-level airway, the connected domain from the voxel set.

8. The method of claim 6 further comprising:
determining, based on the first comparison and the second comparison, a voxel not belonging to the second-level airway; and
removing, when the voxel is determined not to belong to the second-level airway, the voxel from the voxel set.

9. The method of claim 4, wherein the first growing potential energy is associated with at least one first weighting factor, the second growing potential energy is associated with at least one second weighting factor, and the method further includes:
adjusting, when the voxel set is determined not to belong to the second-level airway, the at least one first weighting factor, or the at least one second weighting factor, or both.

10. The method of claim 1, wherein the first-level airway includes a low-level bronchus of a lung region, and the second-level airway includes a terminal bronchiole of a lung region.

11. The method of claim 1 further comprising:
identifying a lung organ;
identifying a lung tissue based on the fused airway and the lung organ; and
labelling a left lung tissue or a right lung tissue of the identified lung tissue based on the fused airway.

12. The method of claim 1 further comprising:
identifying a lung organ;
obtaining an image for a 2D layer of the lung organ;
smoothing the image based on a morphology based method; and
labelling a left lung portion of the lung organ including the second-level airway or a right lung portion of the lung organ including the second-level airway based on the smoothed image and the first-level airway.

13. The method of claim 11, the identifying a lung organ comprising:
determining a lung region based on the plurality of voxels;
removing a background based on the determined lung region;
determining a 2D layer based on area of the 2D layer; and
performing 3D region growing based on the 2D layer.

14. The method of claim 13, the determining a lung region comprising:
selecting, from the plurality of voxels, a voxel; and
determining, based on a comparison between a characteristic value of the voxel and a seventh threshold, whether the voxel belongs to the lung region.

15. The method of claim 13, the removing a background comprising:
identifying a background seed near an edge of the lung region; and
performing region growing based on the background seed.

16. A non-transitory computer readable medium comprising executable instructions that, when executed by at least one processor, cause the at least one processor to effectuate a method comprising
acquiring a three-dimensional image data set representative of a region including at least one airway, the data set comprising a plurality of voxels;
identifying a first-level seed within the region;
identifying a first-level airway within the region based on the first-level seed;
defining a plurality of second-level seeds based on the first-level airway;
identifying a second-level airway within the region by performing growing based on the plurality of second-level seeds using an energy-based 3D reconstruction algorithm; and
fusing the first-level airway and the second-level airway to form an airway tree.

17. A system comprising:
at least one processor, and
executable instructions that, when executed by the at least one processor, cause the at least one processor to effectuate a method comprising
acquiring a three-dimensional image data set representative of a region including at least one airway, the data set comprising a plurality of voxels;
identifying a first-level seed within the region;
identifying a first-level airway within the region based on the first-level seed;
defining a plurality of second-level seeds based on the first-level airway;
identifying a second-level airway within the region by performing growing based on the plurality of second-level seeds using an energy-based 3D reconstruction algorithm; and
fusing the first-level airway and the second-level airway to form an airway tree.

18. The method of claim 1, wherein the growing using the energy-based 3D reconstruction algorithm is performed based on at least one growing potential energy of an adjacent voxel of each second-level seed.

19. The method of claim 1, wherein the growing using the energy-based 3D reconstruction algorithm is performed based on a comparison between a first growing potential energy of the at least one growing potential energy at a first state of the adjacent voxel of the each second-level seed and a second growing potential energy of the at least one growing potential energy at a second state of the adjacent voxel of the each second-level seed.

20. The method of claim 1, wherein one of the at least one growing potential energy includes:
- a first term configured to support the growing process in a radial direction;
- a second term configured to support the growing process in a distal direction; and
- a third term configured to limit a growth in a second-level airway tube.

* * * * *